US008107750B2

(12) United States Patent
Spampinato et al.

(10) Patent No.: US 8,107,750 B2
(45) Date of Patent: Jan. 31, 2012

(54) METHOD OF GENERATING MOTION VECTORS OF IMAGES OF A VIDEO SEQUENCE

(75) Inventors: Giuseppe Spampinato, Catania (IT); Arcangelo Ranieri Bruna, San Cataldo (IT); Alfio Castorina, Linera (IT); Alessandro Capra, Gravina di Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 601 days.

(21) Appl. No.: 12/319,078

(22) Filed: Dec. 31, 2008

(65) Prior Publication Data

US 2010/0166300 A1 Jul. 1, 2010

(51) Int. Cl.
*G06K 9/36* (2006.01)
(52) U.S. Cl. ................................ 382/236; 375/240.16
(58) Field of Classification Search .................. 382/236, 382/260–265; 375/240.12–240.18
See application file for complete search history.

(56) References Cited

U.S. PATENT DOCUMENTS

| | | | | |
|---|---|---|---|---|
| 2002/0163968 | A1* | 11/2002 | Moschetti | 375/240.16 |
| 2004/0258155 | A1* | 12/2004 | Lainema et al. | 375/240.16 |
| 2007/0076982 | A1* | 4/2007 | Petrescu | 382/294 |
| 2007/0140591 | A1* | 6/2007 | Kurata | 382/278 |
| 2008/0063069 | A1* | 3/2008 | Sekiguchi et al. | 375/240.16 |
| 2008/0175439 | A1* | 7/2008 | Kurata | 382/107 |
| 2010/0124381 | A1* | 5/2010 | Bossen | 382/240 |

OTHER PUBLICATIONS

Engelsberg et al., "A Comparative Review of Digital Image Stabilizing Algorithms for Mobile Video Communications," IEEE Transactions on Consumer Electronics, 45(3):591-597, Aug. 1999.
Kim et al., "An Efficient Global Motion Characterization Method for Image Processing Applications," IEEE Transactions on Consumer Electronics, 43(4), Nov. 1997, pp. 1010-1018.
Koo et al., "An Image Resolution Enhancing Technique Using Adaptive Sub-Pixel Interpolation for Digital Still Camera System," IEEE Transactions on Consumer Electronics, 45(1):118-123, Feb. 1999.
Paik et al., "An Edge Detection Approach to Digital Image Stabilization Based on Tri-State Adaptive Linear Neurons," IEEE Transactions on Consumer Electronics, 37(3):521-530, Aug. 1991.
Park et al., "An adaptive motion decision system for digital image stabilizer based on edge pattern matching," IEEE, pp. 318-319, 1992.
Vella et al., "Digital Image Stabilization by Adaptive Block Motion Vectors Filtering," IEEE Transactions on Consumer Electronics, 48(3):796-801, Aug. 2002.
Bosco et al., "Digital Video Stabilization through Curve Warping Techniques," IEEE Transactions on Consumer Electronics, 54(2):220-224, May 2008.
Kim et al., "Interlaced-to-progressive conversion using adaptive projection-based global and representative local motion estimation," SPIE Journal of Electronic Imaging, 17(2):023008-1-023008-14, Apr.-Jun. 2008.

* cited by examiner

*Primary Examiner* — Jingge Wu
(74) *Attorney, Agent, or Firm* — Lisa K. Jorgenson; Timothy L. Boller; Seed IP Law Group PLLC

(57) ABSTRACT

A digital image processing system and method for removing motion effects from images of a video sequence, and generating corresponding motion compensated images.

23 Claims, 31 Drawing Sheets

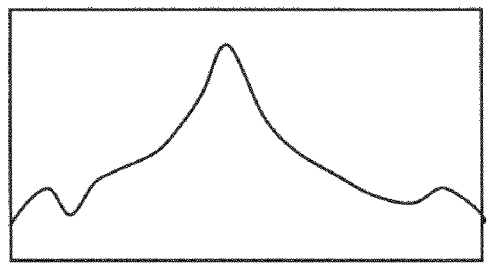
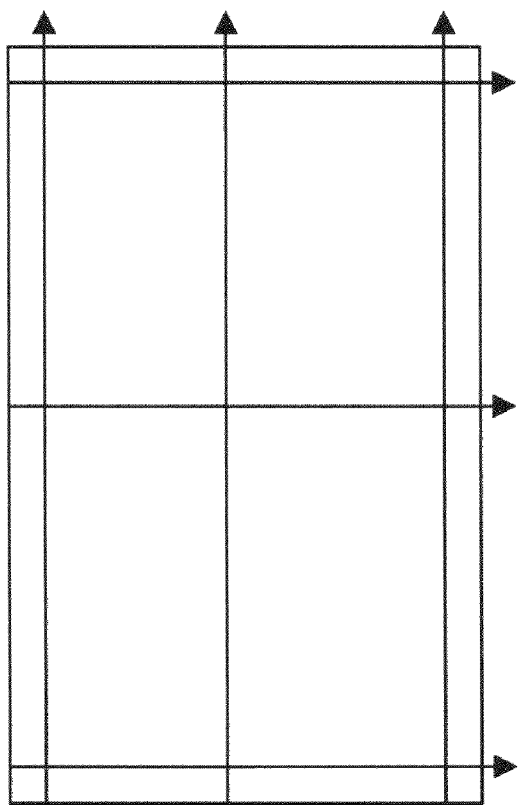
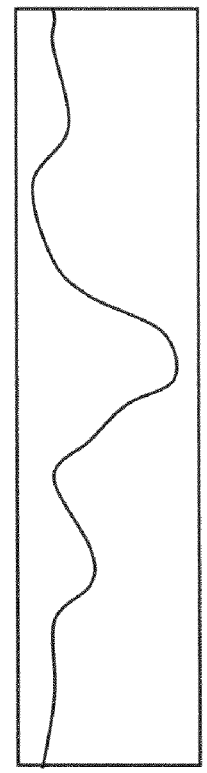
Fig. 1

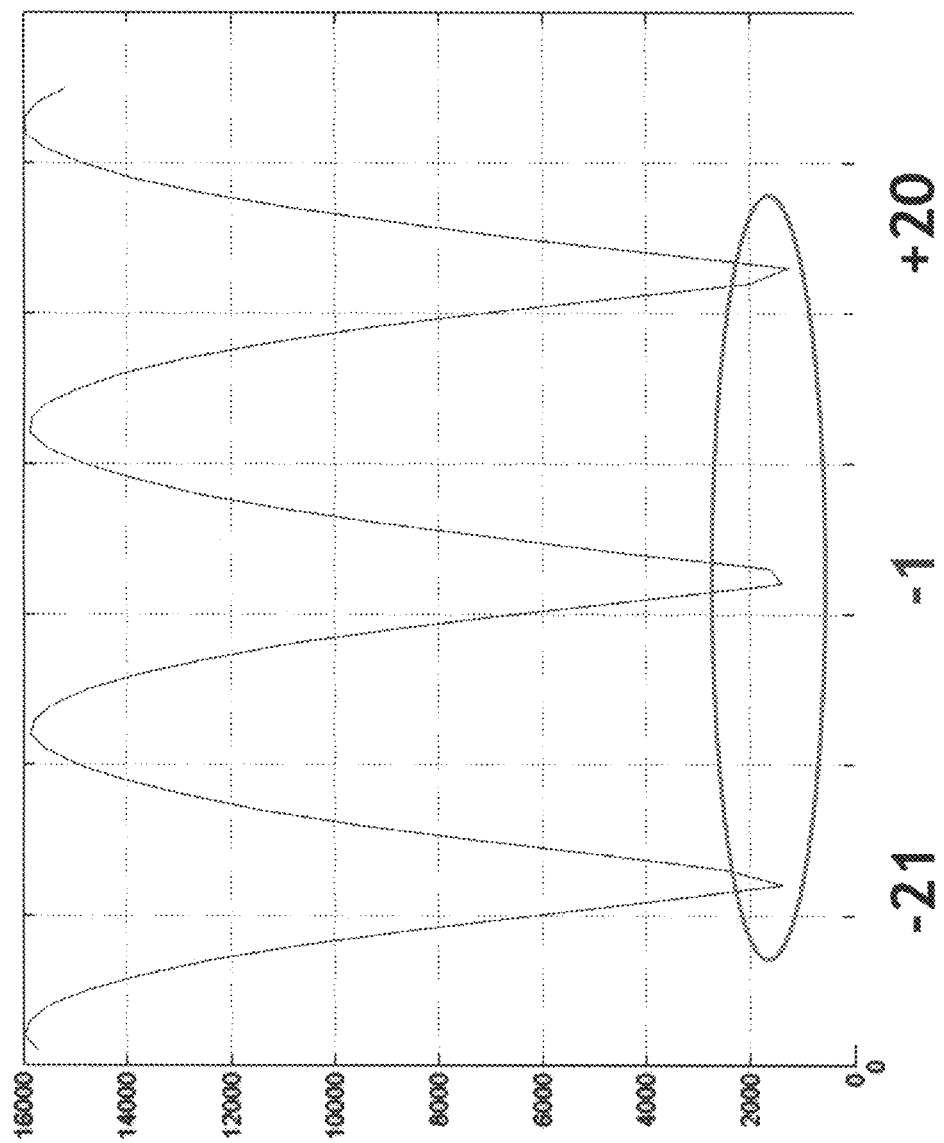

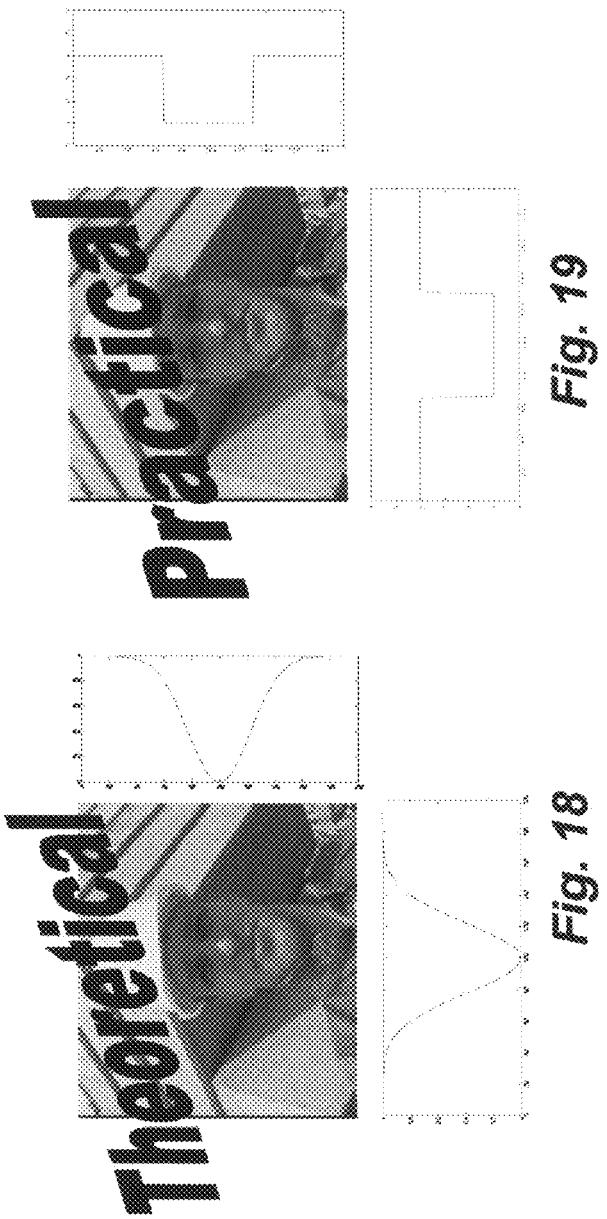

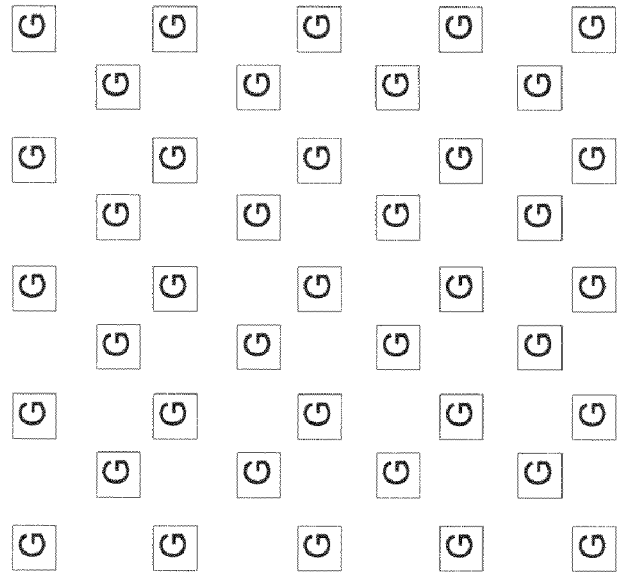
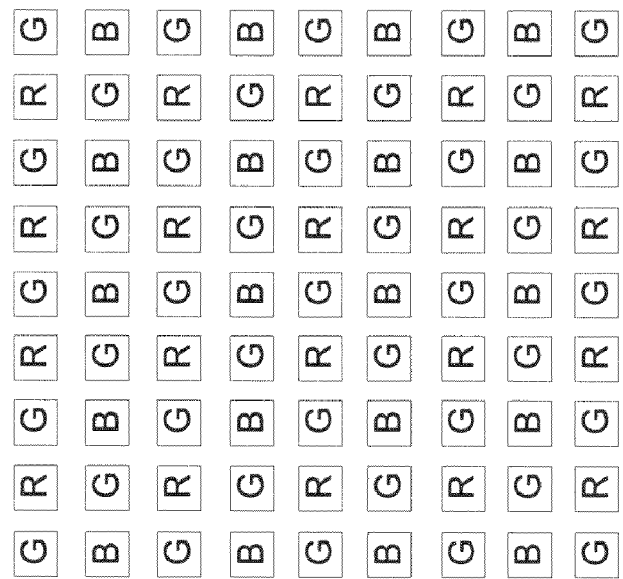
Fig. 31

METHOD OF GENERATING MOTION VECTORS OF IMAGES OF A VIDEO SEQUENCE

BACKGROUND

1. Technical Field

This disclosure relates to digital image processing and more particularly to a method, implementable in a relative device, for calculating global motion vectors of images of a video sequence, and relates to a method of removing motion effects from images of a video sequence, and generating corresponding motion compensated images.

2. Description of the Related Art

Video stabilization serves to compensate for unintentional motion in a video sequence, such as motion caused by user hand shaking that causes unpleasant video sequences for consumers. Various image stabilization techniques (feature based, block matching based, optical flow based, etc.) have been developed. See F. Vella, A. Castorina, M. Mancuso, G. Messina, "Digital Image Stabilization By Adaptive Block Motion Vectors Filtering", *IEEE Transactions On Consumer Electronics*, vol. 48, no. 3, August 2002; A. Engelsberg, G. Schmidt, "A comparative review of digital image stabilising algorithms for mobile video communications", *IEEE Transactions on Consumer Electronics*, Vol. 45, No. 3, August 1999; J. K. Paik, Y. C. Park, D. W. Kim, "An adaptative motion decision system for digital image stabilizer based on edge pattern matching", *IEEE ICCE Consumer Electronics, Digest of Technical Papers*, June 1992; J. K. Paik, Y. C. Park, S. W. Park, "An edge detection approach to digital image stabilization based on tri-state adaptive linear neurons", *IEEE Transactions on Consumer Electronics*, Vol. 37, No. 3, August 1991. Most of these techniques are computationally burdensome and thus unsuited for real time applications.

A simple and fast processing technique is based on motion estimation through horizontal and vertical characteristics curves. See M. Kim, E. Kim, D. Shim, S. Jang, G. Kim, and W. Kim, "An Efficient Global Motion Characterization Method for Image Processing Applications," *IEEE Trans. On Consumer Electronics*, pp. 1010-1018, Nov. 1997; Y. Koo and W. Kim, "An Image Resolution Enhancing Technique Using Adaptive Sub-Pixel Interpolation For Digital Still Camera System", *IEEE Transactions On Consumer Electronics*, Vol. 45, No. 1., February 2005. This is a good choice in particular under the assumption that misalignments are of limited severity and are mostly due to vertical and horizontal shifts.

These methods based on characteristics curves work as follows. For simplicity, let's assume that two gray-scale frames have been captured with two successive captures. The characteristics curves along the horizontal and vertical dimensions are respectively defined as:

$$C_h(j) = \frac{1}{N}\sum_i^N p_{ij}$$

$$C_v(i) = \frac{1}{M}\sum_j^M p_{ij}$$ (1)

wherein M and N are the horizontal and vertical dimensions and $p_{ij}$ is the pixel value in position (i,j).

The meaning of the curves can be easily understood by referring to the drawing of FIG. 1 that illustrates two exemplary characteristics curves. FIG. 2 and FIG. 3 show Ch and Cv curves for two successive frames. A shift of the curves along the x-axis represents an equivalent shift of the frames in the horizontal dimension (similar approach for y-axis and vertical shift). In FIGS. 2 and 3 the horizontal shift is particularly evident. The curves appear to be shifted also along the y-axis, maybe due to slightly changing lighting conditions. Hence, to evaluate the motion occurred between consecutive frames, the shift along the x-axis of both $C_h$ and $C_v$ curves may be obtained by the following formula:

$$P_h(s) = \frac{1}{M-|s|}\sum_{j=max(1,-s)}^{min(M-s,M)} |C_h^{F_1}(j) - C_h^{F_2}(j+s)|$$ (2)

$$off_h = \{s': P_h(s') = \min P_h(s)\}$$

$$P_v(s) = \frac{1}{N-|s|}\sum_{i=max(1,-s)}^{min(N-s,N)} |C_h^{F_1}(i) - C_h^{F_2}(i+s)|$$

$$off_v = \{s': P_v(s') = \min P_v(s)\}$$

Once horizontal $off_h$ and vertical $off_v$ displacements (offsets) between two curves of successive images are computed, by calculating the relative global motion vector (rgmv) it is possible to determine the absolute global motion vector (agmv), that is used for aligning frames belonging to the sequence:

$$agmv = off + rgmv = (off_h + rgmv_x, off_v + rgmv_y)$$ (3)

In practice, when absolute global motion vectors are determined, it is possible to stabilize the video sequence by aligning all frames to a reference frame. This may be done for eliminating only unintentional motion or even for eliminating also intentional motion of the camera.

A drawback of this method consists in that it is relatively sensitive to:
illumination changes;
motion blur;
new details entering into the scene;
moving objects in the scene.

BRIEF SUMMARY

In an embodiment, a method of generating signals representing motion vectors of an image of a video sequence has been devised.

In an embodiment, motion vectors are calculated by defining horizontal and vertical weighing functions that assume larger values over pixels belonging to a zone of interest (ZOI) of the image and smaller values over pixels outside the zone of interest (ZOI). Horizontal and vertical characteristic curves of the image and of the image that precedes in the sequence are computed, and horizontal and vertical global displacements between the two images are calculated as the displacement that minimizes the weighted averages of the absolute value of the difference between taps of the horizontal and vertical characteristic curves of the current image and of a translated replica of the characteristic curve of the image that precedes in the sequence. The current image may then be aligned to the preceding image in function of the horizontal and vertical global displacements, for calculating absolute motion vectors.

In an embodiment, a method may be used for aligning images of a video sequence in respect to a reference image in order to eliminate motion effects. As an option, it is possible to discriminate unintentional motion effects from intentional motion effects and eliminate only unintentional motion.

According to an embodiment, the images to be processed may be, for example, YUV, RGB or Bayer images and luminance or green pixels can be considered in the processing (of course other channels can also be used without limitations).

Embodiments of hardware devices for calculating absolute motion vectors of an image of a video sequence by implementing embodiments of the above methods are also disclosed.

In one embodiment, a method of generating signals representing absolute motion vectors of an image of a video sequence comprises the steps of: defining a horizontal and vertical weighing functions that assume larger values over pixels belonging to a certain portion (zone of interest) of said image and smaller values over pixels outside said certain portion (zone of interest) of said image; computing horizontal and vertical characteristic curves of said image and of the image that precedes in the sequence; calculating a horizontal global displacement between said two images as the displacement that minimizes the weighted average, calculated using said horizontal weighing function, of the absolute value of the difference between the taps of the horizontal characteristic curve of the current image and of a translated replica of the characteristic curve of said image that precedes in the sequence; calculating a vertical global displacement between said two images as the displacement that minimizes the weighted average, calculated using said vertical weighing function, of the absolute value of the difference between the taps of the horizontal characteristic curve of the current image and of a translated replica of the characteristic curve of said image that precedes in the sequence; aligning said image with the image that precedes in the sequence and calculating relative motion vectors between the so aligned images; and generating said signals representing absolute motion vectors between said images as the vector sum of said relative motion vectors and said horizontal and vertical global displacement.

In one embodiment, a method of filtering an image of an input video sequence from motion effects, for generating a corresponding filtered output image, comprises the steps of: defining a horizontal and vertical weighing functions that assume larger values over pixels belonging to a certain portion (zone of interest) of said image and smaller values over pixels outside said certain portion (zone of interest) of said image; computing horizontal and vertical characteristic curves of said image and of the image that precedes in the sequence; calculating a horizontal global displacement between said two images as the displacement that minimizes the weighted average, calculated using said horizontal weighing function, of the absolute value of the difference between the taps of the horizontal characteristic curve of the current image and of a translated replica of the characteristic curve of said image that precedes in the sequence; calculating a vertical global displacement between said two images as the displacement that minimizes the weighted average, calculated using said vertical weighing function, of the absolute value of the difference between the taps of the vertical characteristic curve of the current image and of a translated replica of the characteristic curve of said image that precedes in the sequence; and generating said filtered output image by filtering out said horizontal and vertical global displacements from the current image.

In one embodiment, a method of filtering an image of an input video sequence from unintentional motion effects, for generating a corresponding filtered output image, comprising the steps of: computing horizontal and vertical characteristic curves of said image and of the image that precedes in the sequence, then generating corresponding high-pass replica thereof using a high-pass filter; calculating a horizontal global displacement between said two images as the displacement that minimizes the average of the absolute value of the difference between the taps of the horizontal high-pass replica characteristic curve of the current image and of a translated replica of the high-pass replica characteristic curve of said image that precedes in the sequence; calculating a vertical global displacement between said two images as the displacement that minimizes the average of the absolute value of the difference between the taps of the vertical high-pass replica characteristic curve of the current image and of a translated replica of the high-pass replica characteristic curve of said image that precedes in the sequence; and generating said filtered output image by filtering out said horizontal and vertical global displacements from the current image. In one embodiment, the method further comprises the step of high-pass filtering motion vectors with a second order Butterworth IIR high-pass filter, direct form II, with a cut-off frequency of about 0.40 Hz. In one embodiment, the method further comprises the step of high-pass filtering motion vectors with a second order Butterworth IIR high-pass filter, direct form II, with a cut-off frequency of about 0.40 Hz divided by half the frame rate of said video sequence.

In one embodiment, a method of filtering an image of an input video sequence from motion effects, for generating a corresponding filtered output image, comprises the steps of: computing horizontal and vertical characteristic curves of said image and of the image that precedes in the sequence, then generating corresponding band-pass replica thereof using a Butterworth IIR band-pass filter; calculating a horizontal global displacement between said two images as the displacement that minimizes the average of the absolute value of the difference between the taps of the horizontal band-pass replica characteristic curve of the current image and of a translated replica of the band-pass replica characteristic curve of said image that precedes in the sequence; calculating a vertical global displacement between said two images as the displacement that minimizes the average of the absolute value of the difference between the taps of the vertical band-pass replica characteristic curve of the current image and of a translated replica of the band-pass replica characteristic curve of said image that precedes in the sequence; and generating said filtered output image by filtering out said horizontal and vertical global displacements from the current image. In one embodiment, said Butterworth IIR band-pass filter has cut-off frequencies of about 0.01 Hz and 0.20 Hz.

In one embodiment, a method of filtering an image of an input video sequence from motion effects, for generating a corresponding filtered output image, comprises the steps of: computing horizontal and vertical characteristic curves of said image and of the image that precedes in the sequence, then generating corresponding high-pass replica thereof; calculating a horizontal global displacement between said two images as the displacement that minimizes the average of the absolute value of the difference between the taps of the horizontal high-pass replica characteristic curve of the current image and of a translated replica of the high-pass replica characteristic curve of said image that precedes in the sequence; calculating a vertical global displacement between said two images as the displacement that minimizes the average of the absolute value of the difference between the taps of the vertical high-pass replica characteristic curve of the current image and of a translated replica of the high-pass replica characteristic curve of said image that precedes in the sequence; and generating said filtered output image by filtering out said horizontal and vertical global displacements from the current image. In one embodiment, said high-pass filter is the FIR [−1 −8 −28 −55 −62 −28 28 62 55 28 8 1].

In one embodiment, said images are YUV or RGB images and said characteristic curves are calculated considering only luminance values of pixels. In one embodiment, said images are YUV or RGB images and said characteristic curves are calculated considering only green pixels. In one embodiment, said images are Bayer images and said characteristic curves are calculated considering only green pixels. The method of claim 1, wherein said horizontal and vertical weighing functions are null outside said certain portion (zone of interest) and, within said certain portion (zone of interest), are respectively equal to the horizontal and vertical size of the current image.

In one embodiment, a hardware device to process digital images comprises: a Bayer sensor (Sensor) generating Bayer pattern images (CFA) of captured scenes; a first processing circuit (Curve gen) that outputs horizontal and/or vertical characteristic curves of said Bayer pattern images (CFA); a DRAM storing said Bayer pattern images (CFA) and the respective characteristic curves; a DSP input with said Bayer pattern images (CFA) and the respective characteristic curves, adapted to implement the steps of one or more of the methods disclosed herein and generate motion vectors.

In one embodiment, a method of generating signals representing absolute motion vectors of an image of a video sequence comprises: defining horizontal and vertical weighing functions with values over pixels belonging to a first portion of the image being larger than values over pixels outside the first portion of the image; computing horizontal and vertical characteristic curves of the image and of a preceding image in the video sequence; determining a horizontal global displacement between the two images that minimizes a weighted average, calculated using the horizontal weighing function, of an absolute value of a difference between taps of the horizontal characteristic curve of the current image and of a translated replica of the horizontal characteristic curve of the preceding image in the sequence; determining a vertical global displacement between the two images that minimizes a weighted average, calculated using the vertical weighing function, of an absolute value of a difference between taps of the vertical characteristic curve of the current image and of a translated replica of the vertical characteristic curve of the preceding image in the sequence; aligning the image with the preceding image in the sequence and calculating relative motion vectors between the aligned images; and generating the signals representing absolute motion vectors between the images as a vector sum of the relative motion vectors and the horizontal and vertical global displacement. In one embodiment, the images are YUV or RGB images and the characteristic curves are calculated considering only luminance values of pixels. In one embodiment, the images are YUV or RGB images and the characteristic curves are calculated considering only green pixels. In one embodiment, the images are Bayer images and the characteristic curves are calculated considering only green pixels. In one embodiment, the horizontal and vertical weighing functions are null outside the first portion and, within the first portion, are respectively equal to a horizontal and vertical size of the current image.

In one embodiment, a method of filtering an image of an input video sequence comprises: defining horizontal and vertical weighing functions with values over pixels belonging to a first portion of the image being larger than values over pixels outside the first portion of said image; computing horizontal and vertical characteristic curves of the image and of a preceding image in the sequence; determining a horizontal global displacement between the two images that minimizes a weighted average, calculated using the horizontal weighing function, of an absolute value of a difference between taps of the horizontal characteristic curve of the current image and of a translated replica of the horizontal characteristic curve of the preceding image in the sequence; determining a vertical global displacement between the two images that minimizes a weighted average, calculated using the vertical weighing function, of an absolute value of a difference between taps of the vertical characteristic curve of the current image and of a translated replica of the vertical characteristic curve of the preceding image in the sequence; and generating a filtered output image by filtering out the horizontal and vertical global displacements from the current image.

In one embodiment, a method of filtering an image of an input video sequence comprises: computing horizontal and vertical characteristic curves of the image and of a preceding image in the sequence, then generating corresponding high-pass replicas thereof using a high-pass filter; calculating a horizontal global displacement between the two images that minimizes an average of an absolute value of a difference between taps of the horizontal high-pass replica characteristic curve of the current image and of a translated replica of the high-pass replica horizontal characteristic curve of the preceding image in the sequence; calculating a vertical global displacement between the two images that minimizes an average of an absolute value of a difference between taps of the vertical high-pass replica characteristic curve of the current image and of a translated replica of the vertical high-pass replica characteristic curve of the preceding image in the sequence; and generating a filtered output image by filtering out the horizontal and vertical global displacements from the current image. In one embodiment, the method further comprises: high-pass filtering motion vectors with a second order Butterworth IIR high-pass filter, direct form II, with a cut-off frequency of about 0.40 Hz. In one embodiment, the method further comprises: high-pass filtering motion vectors with a second order Butterworth IIR high-pass filter, direct form II, with a cut-off frequency of about 0.40 Hz divided by half a frame rate of the video sequence.

In one embodiment, a method of filtering an image of an input video sequence comprises: computing horizontal and vertical characteristic curves of the image and of a preceding image in the sequence, then generating corresponding band-pass replicas thereof using a Butterworth IIR band-pass filter; calculating a horizontal global displacement between the two images that minimizes an average of an absolute value of a difference between taps of the horizontal band-pass replica characteristic curve of the current image and of a translated replica of the horizontal band-pass replica characteristic curve of the proceeding image in the sequence; calculating a vertical global displacement between the two images that minimizes an average of an absolute value of a difference between taps of the vertical band-pass replica characteristic curve of the current image and of a translated replica of the vertical band-pass replica characteristic curve of the preceding image in the sequence; and generating a filtered output image by filtering out the horizontal and vertical global displacements from the current image. In one embodiment, the Butterworth IIR band-pass filter has cut-off frequencies of about 0.01 Hz and 0.20 Hz.

In one embodiment, a method of filtering an image of an input video sequence comprises: computing horizontal and vertical characteristic curves of the image and of a preceding image in the sequence, then generating corresponding high-pass replicas thereof; calculating a horizontal global displacement between the two images that minimizes an average of an absolute value of a difference between taps of the horizontal high-pass replica characteristic curve of the current image and of a translated replica of the horizontal high-pass replica characteristic curve of the proceeding image in the sequence; calculating a vertical global displacement between the two images that minimizes an average of an absolute value of a difference between taps of the vertical high-pass replica characteristic curve of the current image and of a translated replica of the vertical high-pass replica characteristic curve of the preceding image in the sequence; and generating a filtered output image by filtering out the horizontal and vertical global displacements from the current image. In one embodiment, a FIR [−1 −8 −28 −55 −62 −28 28 62 55 28 8 1] is employed. In one embodiment, the images are YUV or RGB images and the characteristic curves are calculated considering only luminance values of pixels. In one embodiment, the images are YUV or RGB images and the characteristic curves are calculated considering only green pixels. In one embodiment, wherein the images are Bayer images and the characteristic curves are calculated considering only green pixels.

In one embodiment, a system to process digital images comprises: a Bayer sensor configured to generate Bayer pattern images of captured scenes; a curve generator configured to generate characteristic curves of the Bayer pattern images; a memory storing the Bayer pattern images and the respective characteristic curves; and a digital signal processor configured to generate absolute global motion vectors based on the Bayer images and the respective characteristic curves. In one embodiment, the digital signal processor is configured to: determine a horizontal global displacement between a current image and a preceding image that minimizes a weighted average, calculated using a horizontal weighing function, of an absolute value of a difference between taps of a horizontal characteristic curve of the current image and of a translated replica of a horizontal characteristic curve of the preceding image in the sequence; determine a vertical global displacement between the two images that minimizes a weighted average, calculated using a vertical weighing function, of an absolute value of a difference between taps of a vertical characteristic curve of the current image and of a translated replica of a vertical characteristic curve of the preceding image in the sequence; align the current image with the preceding image in the sequence and calculate relative motion vectors between the aligned images; and generate signals representing absolute motion vectors between the images as a vector sum of the relative motion vectors and the horizontal and vertical global displacement. In one embodiment, the digital signal processor is configured to: determine a horizontal global displacement between a current image and a preceding image that minimizes a weighted average, calculated using a horizontal weighing function, of an absolute value of a difference between taps of a horizontal characteristic curve of the current image and of a translated replica of a horizontal characteristic curve of the preceding image in the sequence; determine a vertical global displacement between the two images that minimizes a weighted average, calculated using a vertical weighing function, of an absolute value of a difference between taps of a horizontal characteristic curve of the current image and of a translated replica of a characteristic curve of the preceding image in the sequence; align the current image with the preceding image in the sequence and calculate relative motion vectors between the aligned images; and generate signals representing absolute motion vectors between the images as a vector sum of the relative motion vectors and the horizontal and vertical global displacement.

In one embodiment, a computer readable memory medium comprises contents that cause a computing device to implement a method of processing a digital image, the method including: defining horizontal and vertical weighing functions with values over pixels belonging to a first portion of the image being larger than values over pixels outside the first portion of the image; computing horizontal and vertical characteristic curves of the image and of a preceding image in the video sequence; determining a horizontal global displacement between the two images that minimizes a weighted average, calculated using the horizontal weighing function, of an absolute value of a difference between taps of the horizontal characteristic curve of the current image and of a translated replica of the horizontal characteristic curve of the preceding image in the sequence; determining a vertical global displacement between the two images that minimizes a weighted average, calculated using the vertical weighing function, of an absolute value of a difference between taps of the vertical characteristic curve of the current image and of a translated replica of the vertical characteristic curve of the preceding image in the sequence; aligning the image with the preceding image in the sequence and calculating relative motion vectors between the aligned images; and generating the signals representing absolute motion vectors between the images as a vector sum of the relative motion vectors and the horizontal and vertical global displacement.

In one embodiment, a method of generating signals representing absolute motion vectors of an image of a video sequence, comprises: defining horizontal and vertical weighing functions with values over pixels belonging to a first portion of the image being larger than values over pixels outside the first portion of the image; computing horizontal and vertical characteristic curves of the image and of a preceding image in the video sequence; determining a horizontal global displacement between the two images that minimizes a weighted average, calculated using the horizontal weighing function, of an absolute value of a difference between taps of the horizontal characteristic curve of the current image and of a translated replica of the characteristic curve of the preceding image in the sequence; determining a vertical global displacement between the two images that minimizes a weighted average, calculated using the vertical weighing function, of an absolute value of a difference between taps of the horizontal characteristic curve of the current image and of a translated replica of the characteristic curve of the preceding image in the sequence; aligning the image with the preceding image in the sequence and calculating relative motion vectors between the aligned images; and generating the signals representing absolute motion vectors between the images as a vector sum of the relative motion vectors and the horizontal and vertical global displacement. In one embodiment, the images are YUV or RGB images and the characteristic curves are calculated considering only luminance values of pixels. In one embodiment, the images are Bayer images and the characteristic curves are calculated considering only green pixels. In one embodiment, the horizontal and vertical weighing functions are null outside the first portion and, within the first portion, are respectively equal to a horizontal and vertical size of the current image.

BRIEF DESCRIPTION OF THE SEVERAL VIEWS OF THE DRAWINGS

FIG. 1 shows how characteristic curves are computed.

FIG. 17 shows example matching results in the case of a frame with regular pattern (s=[−32, 32]).

FIG. 18 illustrates an embodiment of a theoretical way of selecting the Zone Of Interest ZOI.

FIG. 19 illustrates an embodiment of a practical way of selecting the Zone Of Interest ZOI.

FIG. 31 shows an example Bayer pattern (left) and an example extracted green plane (right).

DETAILED DESCRIPTION

In the following description, numerous specific details are given to provide a thorough understanding of embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" "according to an embodiment" or "in an embodiment" and similar phrases in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Commonly, misalignments between frames of a video sequence are of limited entity and are mostly due to vertical and horizontal shifts (rotations are not so perceived for optical models with a wide Field of View).

The ensuing description is organized in chapters for an easier illustration.

Figure 2:
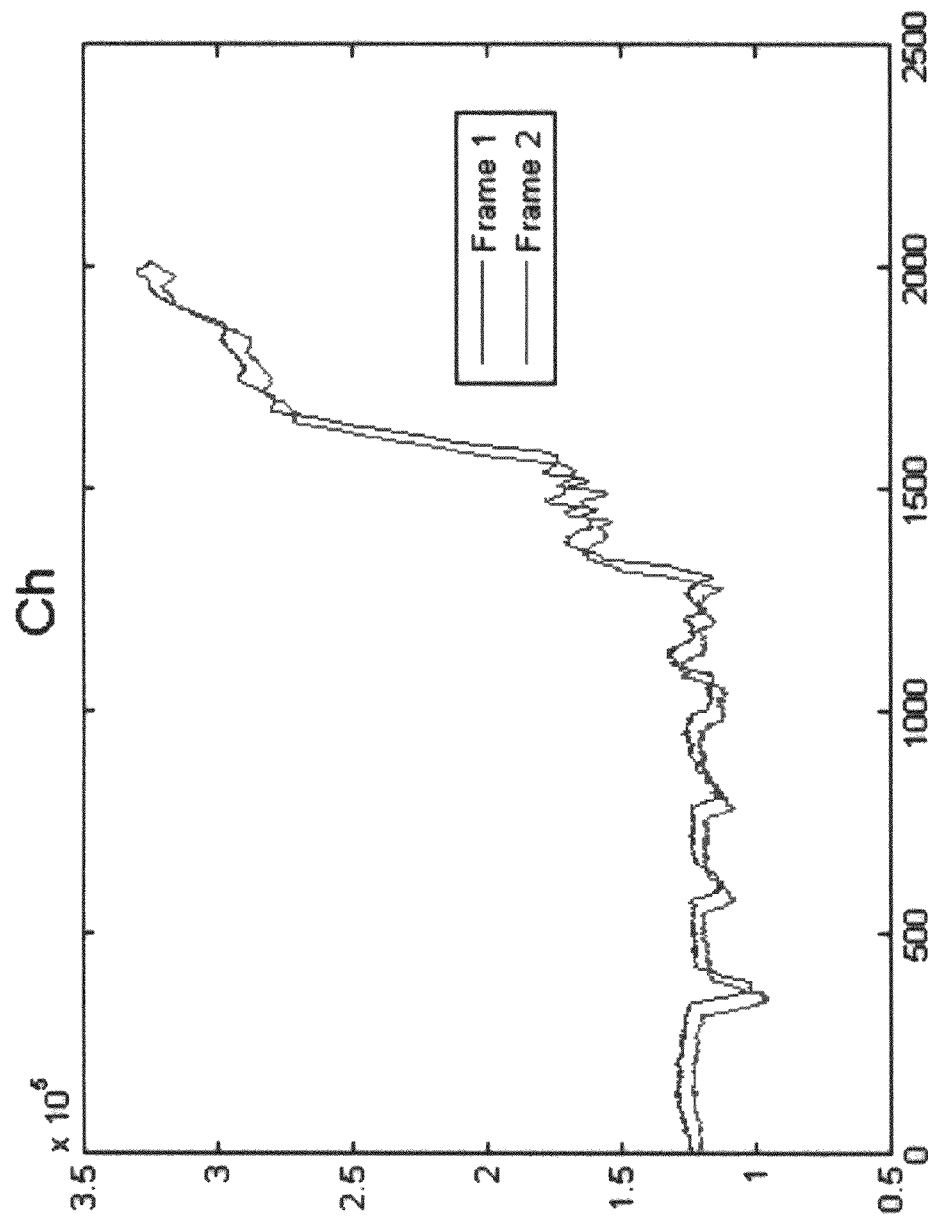
FIG. 2 shows two horizontal characteristic curves, the offset along x-axis corresponding to a horizontal shift between frames.
Figure 3:
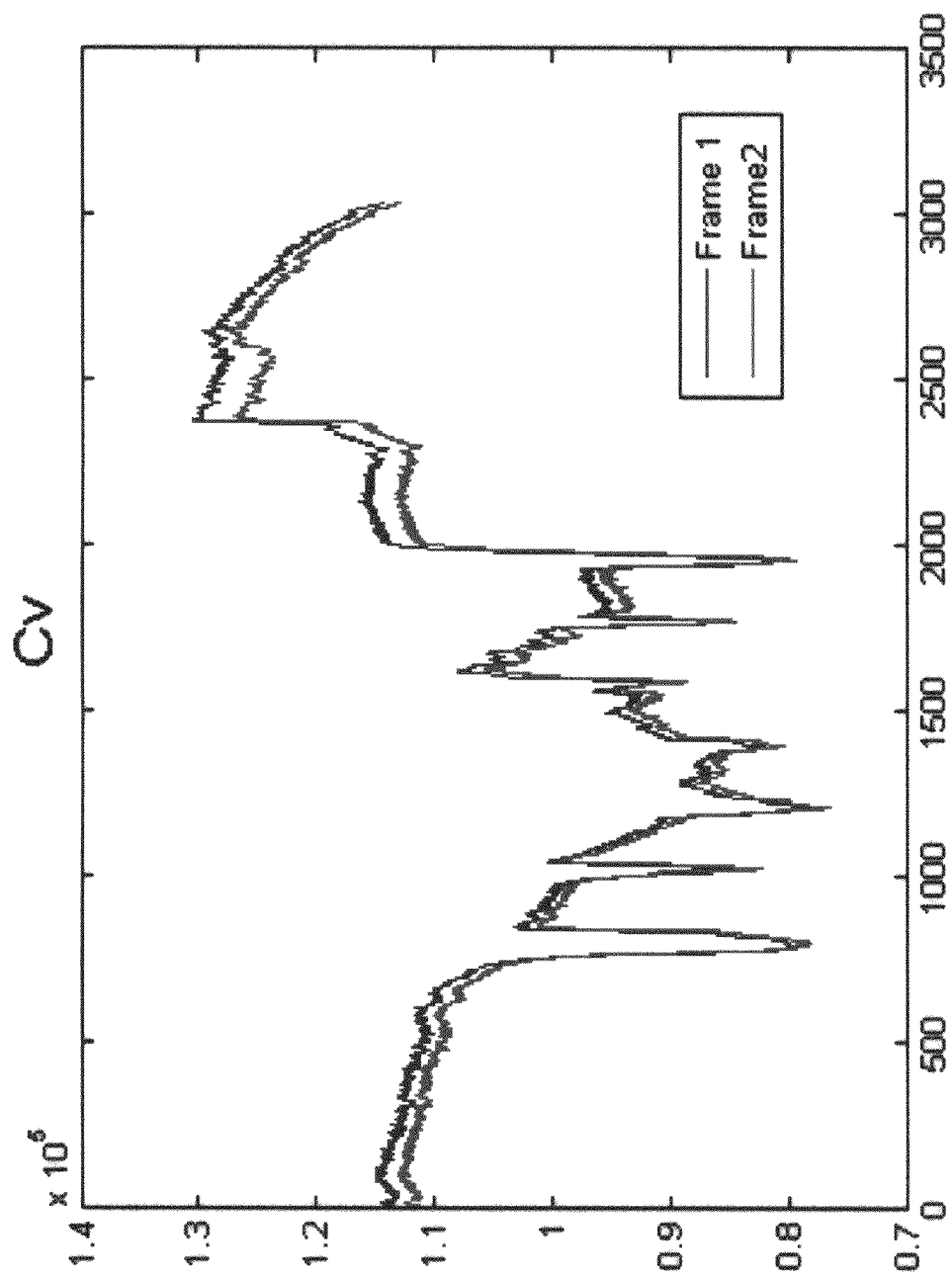
FIG. 3 shows two vertical characteristic curves, the offset along x-axis corresponding to a vertical shift between frames.
Figure 4:
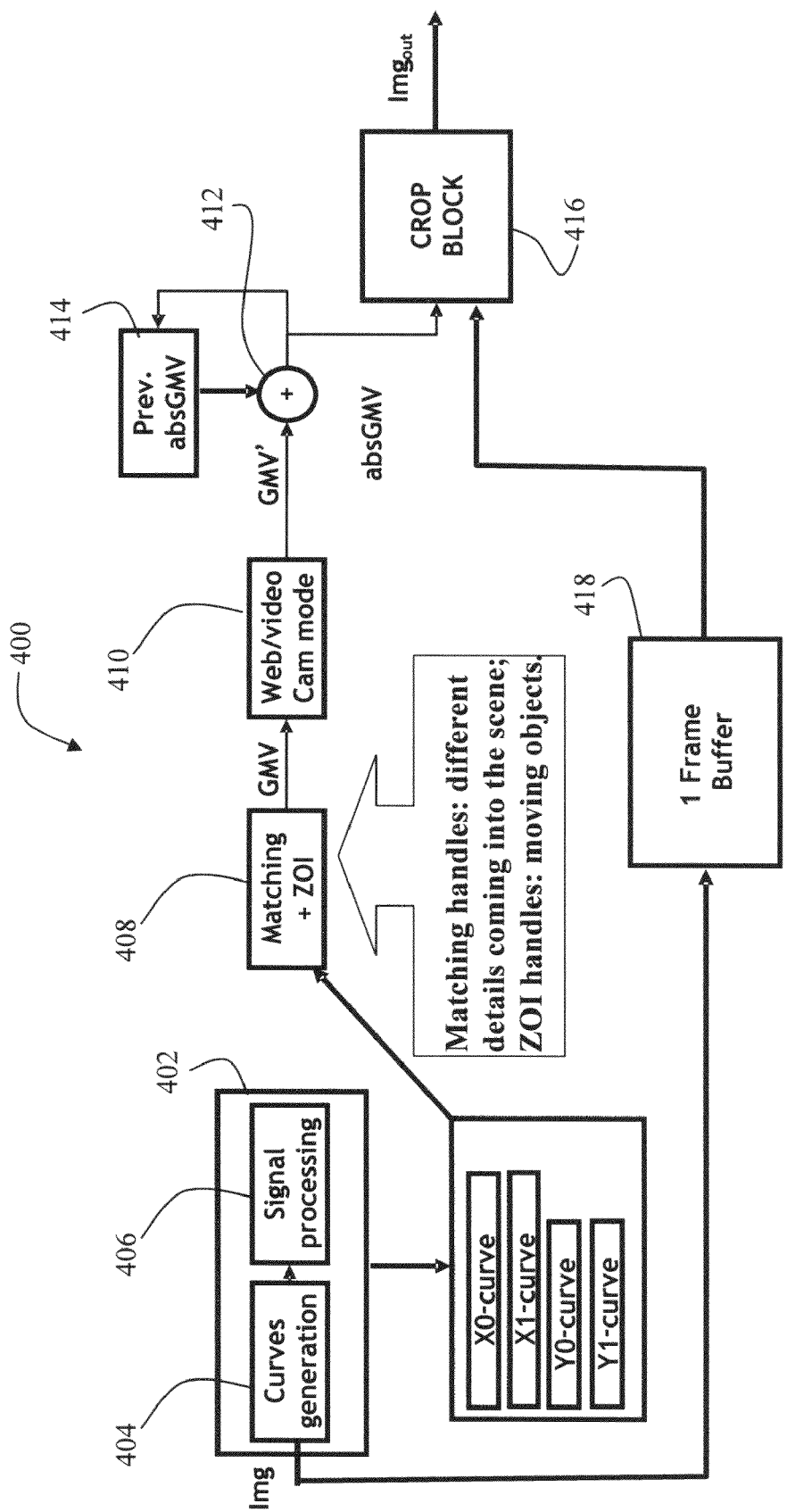
FIG. 4 is a functional block diagram of an embodiment of a system for processing digital images.

A functional block diagram of an embodiment of a system 400 to process digital images is shown in FIG. 4. The system 400 comprises an image processing block 402 configured to address scene illumination changes and blurring. As illustrated, the image processing block 402 comprises a curve generation block 404 and a signal processing block 406. The system 400 also comprises a matching and zone of interest (ZOI) control block 408, a web/video cam mode block 410, an accumulator block 414, a delay block 414, a frame buffer 418 and a crop block 416.

Curves Generation

In an embodiment, the curve generation block 404 is configured to calculate characteristics curves along the horizontal and vertical dimensions, which may be done according to equation (1).

Signal Processing

In an embodiment, t the signal processing block 406 is configured to attenuate scene illumination changes and motion blur effects. Integral Projection techniques suffer from these variations and even a simple global normalization does not always handle these problems correctly.

1.1 Illumination Change

Figure 5:
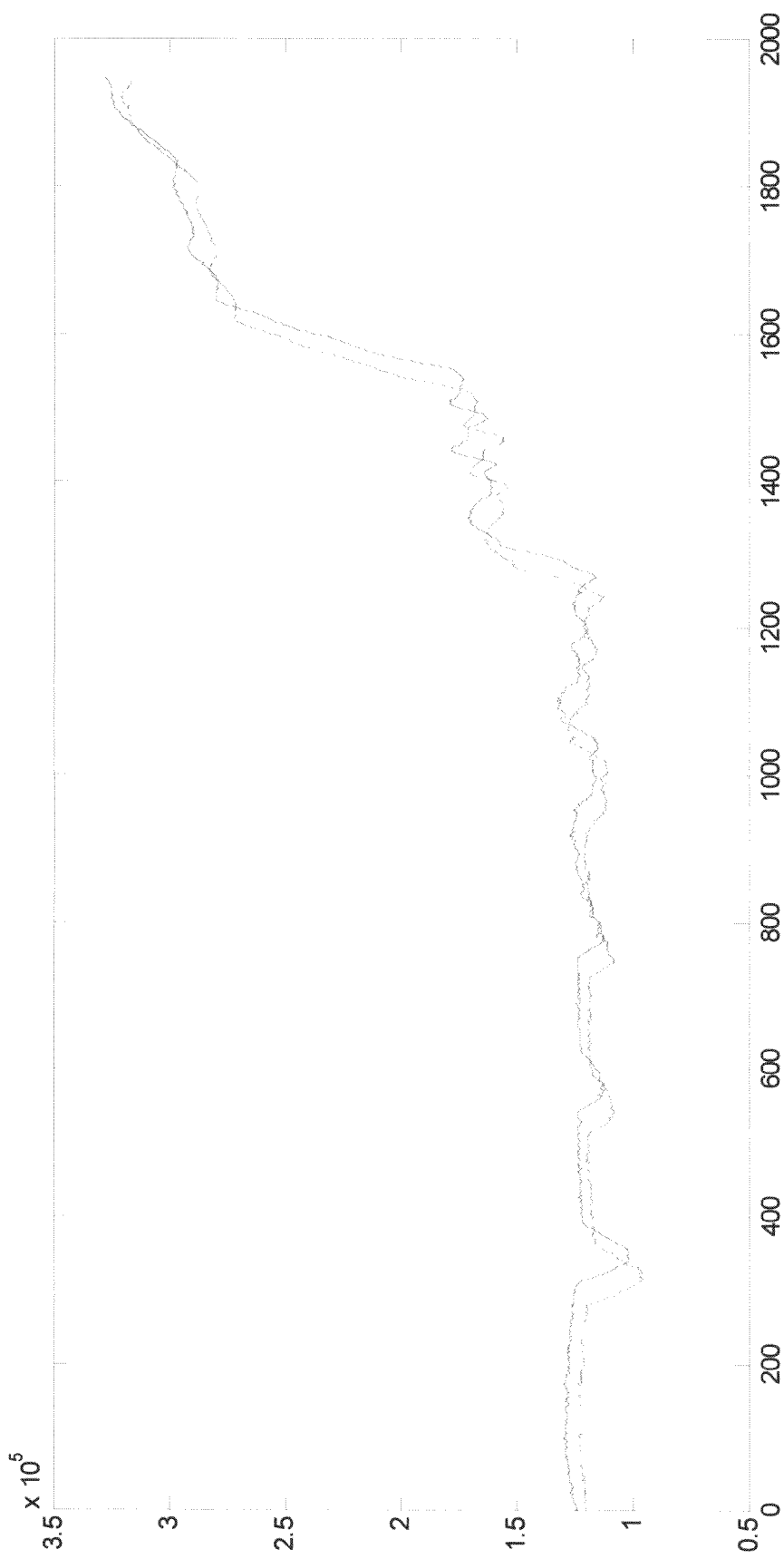
FIG. 5 shows an example of two successive characteristics curves in case of illumination changes.
Figure 6:
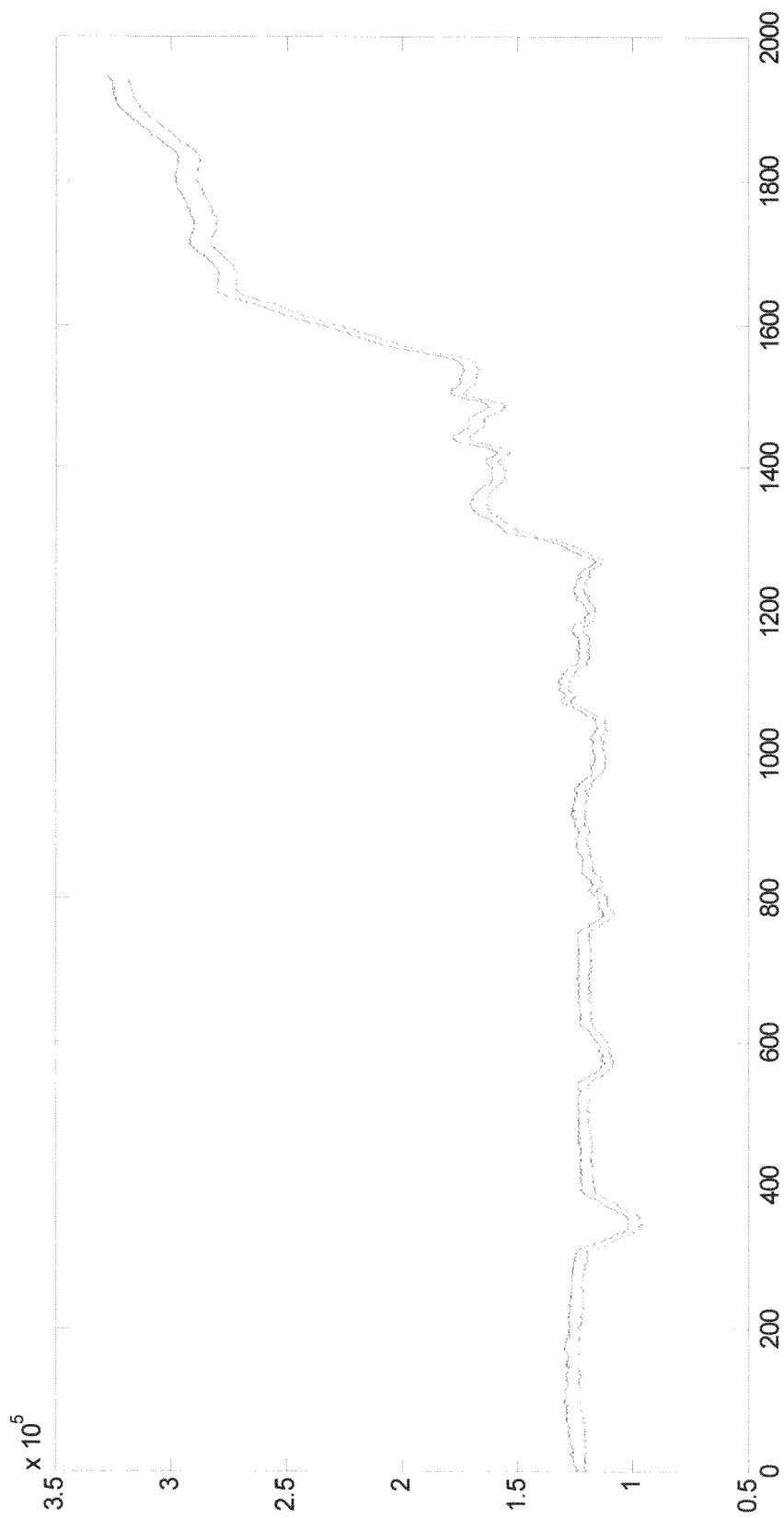
FIG. 6 shows an example ideal matching of two successive characteristics curves in case of illumination changes (perfect matching=−29).
Figure 7:
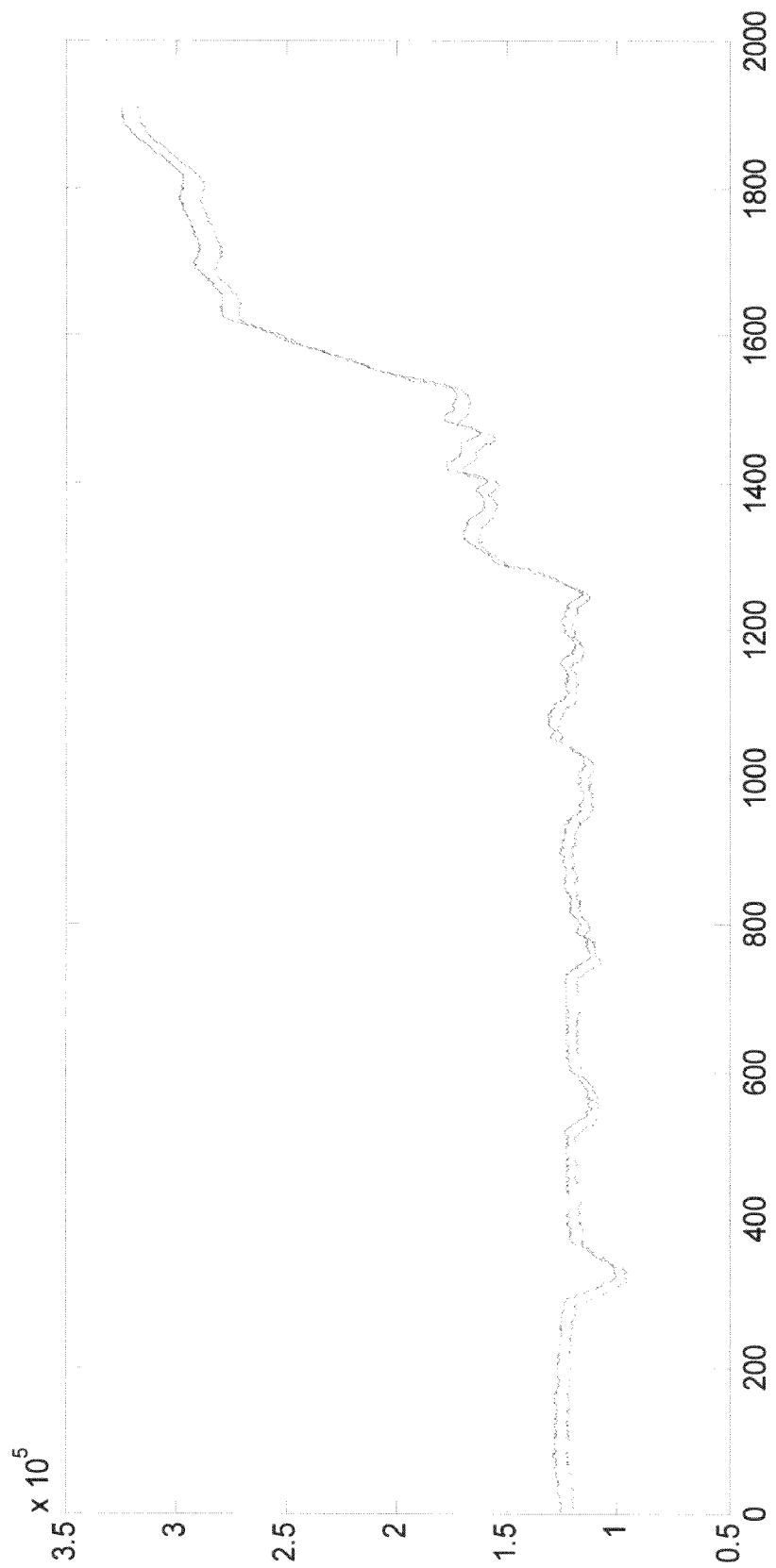
FIG. 7 shows example matching results with integral projection in the case of scene illumination changes (wrong matching=−25)

Effects of illumination changes in calculated characteristics curves will be illustrated through an example. Two curves of successive images are displayed in FIG. 5. The curves are similar, but the values are slightly different because of scene illumination changes. The result of the ideal matching (−29) is shown in FIG. 6. With a known integral projection method the matching is incorrect, as illustrated in FIG. 7, essentially because high dynamic changes occurred around the point 1600, causing an erroneous alignment.

In these cases, improved stabilization may be obtained by pre-filtering the characteristics curve with a High Pass Filter (HPF):

$$C_x^{fil} = C_x - (C_x \otimes LPF)$$

$$C_y^{fil} = C_y - (C_y \otimes LPF) \qquad (4)$$

wherein $C_x \otimes LPF$ and $C_y \otimes LPF$ are the low-pass replica of the curves $C_x$ and $C_y$. High-pass filtering enhances curve peaks and thus improves results of alignment between two images.

Figure 8:
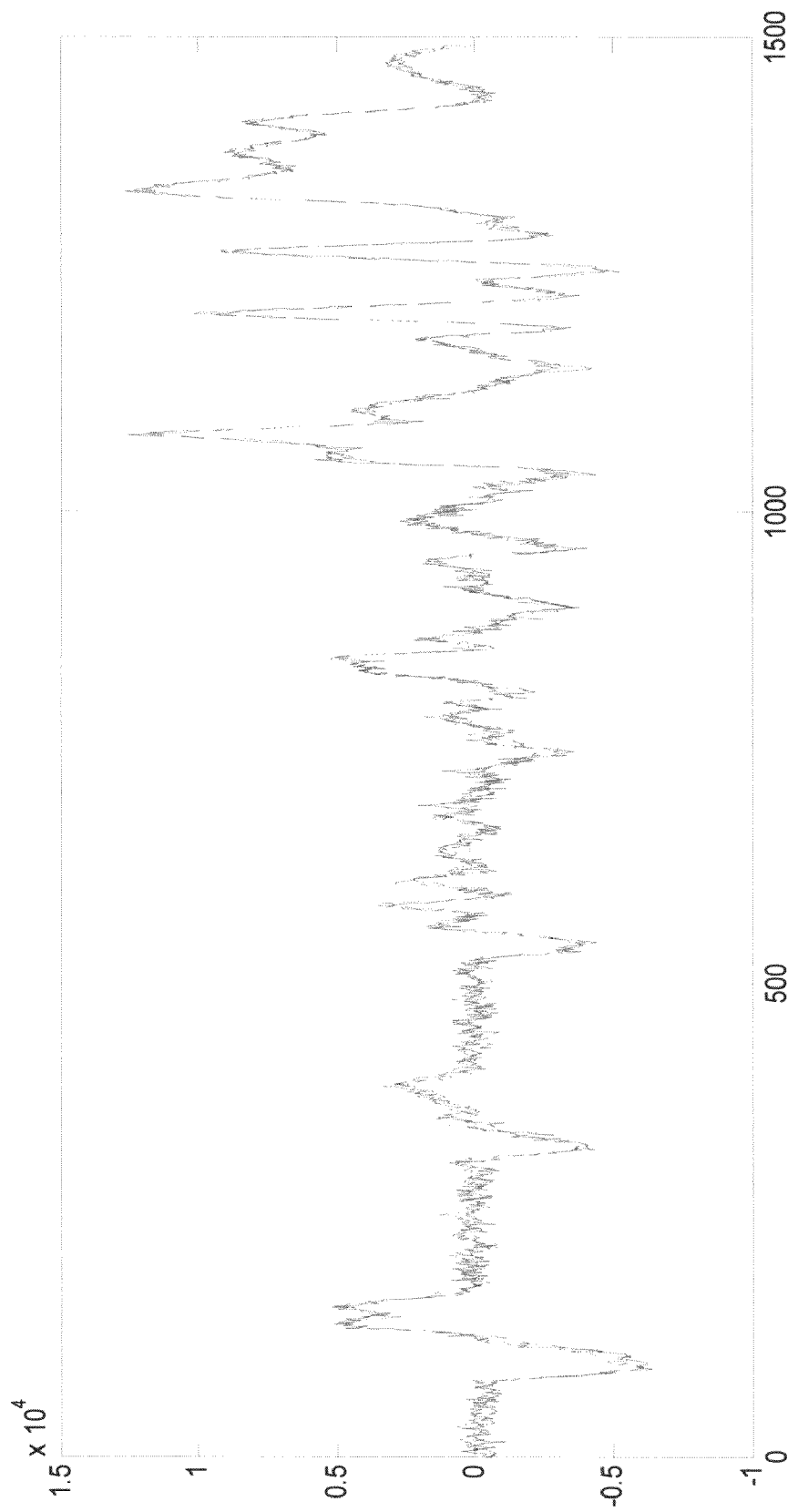
FIG. 8 shows example matching results obtained applying a simple HPF to the characteristics curves in case of scene illumination changes (perfect matching=−29).

According to an embodiment, with the following LPF [1111111111111111]/16, a simple HPF is obtained that gives good results and implies negligible extra costs. In the example proposed, with this simple filter a perfect matching (−29) is obtained, as shown in FIG. 8.

Figure 9:
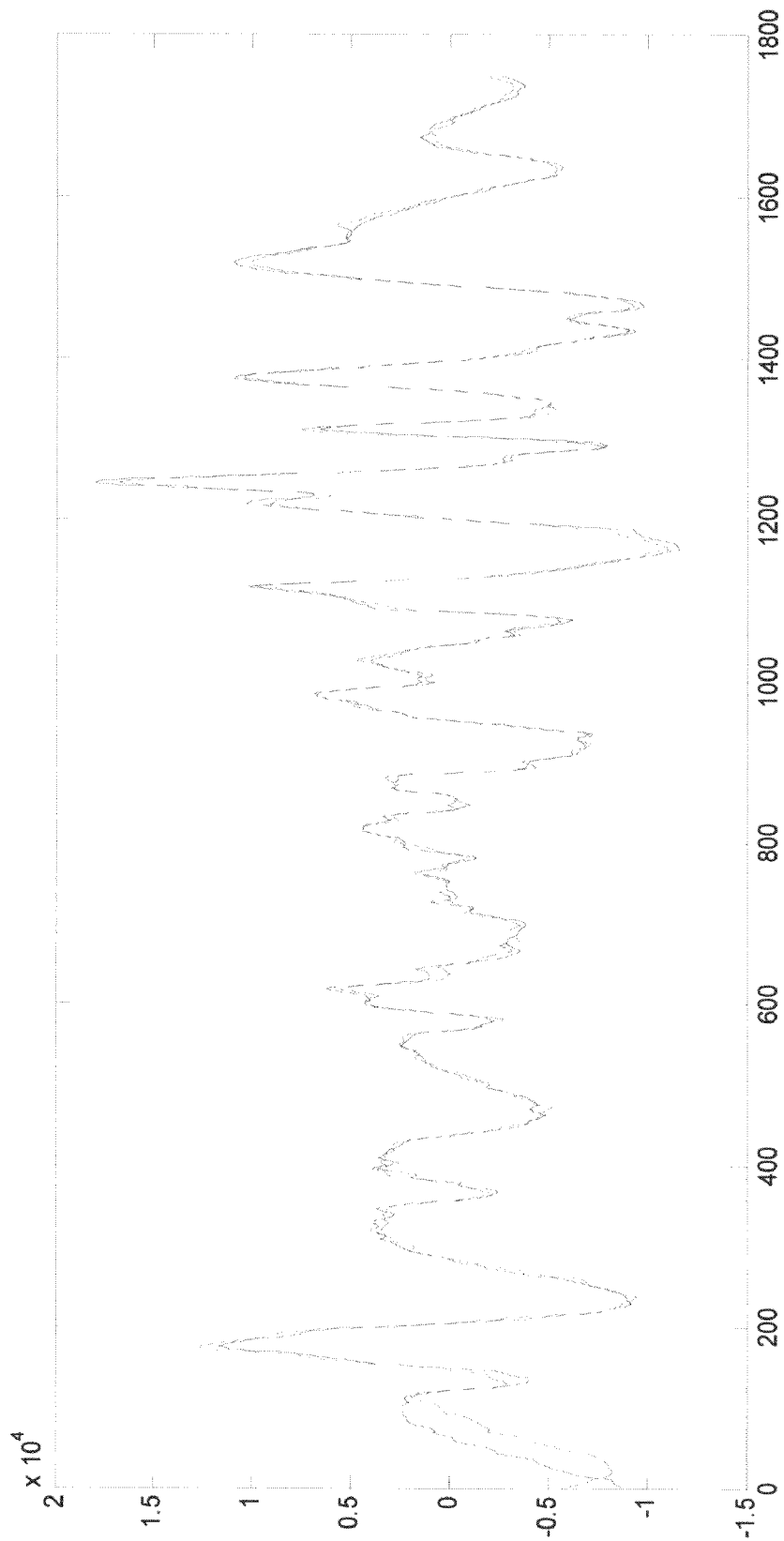
FIG. 9 shows example matching results obtained applying a IIR BPF to the characteristics curves in case of scene illumination changes (perfect matching=−29).

Alternatively, the perfect matching (−29) may also be obtained using a Butterworth IIR Band Pass Filter (BPF), as depicted in FIG. 9.

As an example, it is possible to use a 2nd order filter, Direct form II, with cutoff frequencies w1=0.01 Hz and w2=0.20 Hz. FIG. 9 has been obtained using a MatLab environment which resulted in a transient around the 0 abscissa. This problem may be avoided in case of software implementation, by filling conveniently the input taps (in this particular case there are 3 taps, because the chosen filter is of the 2nd order) of the IIR filter, at the beginning of the process with the same value (the first incoming element).

Figure 20:
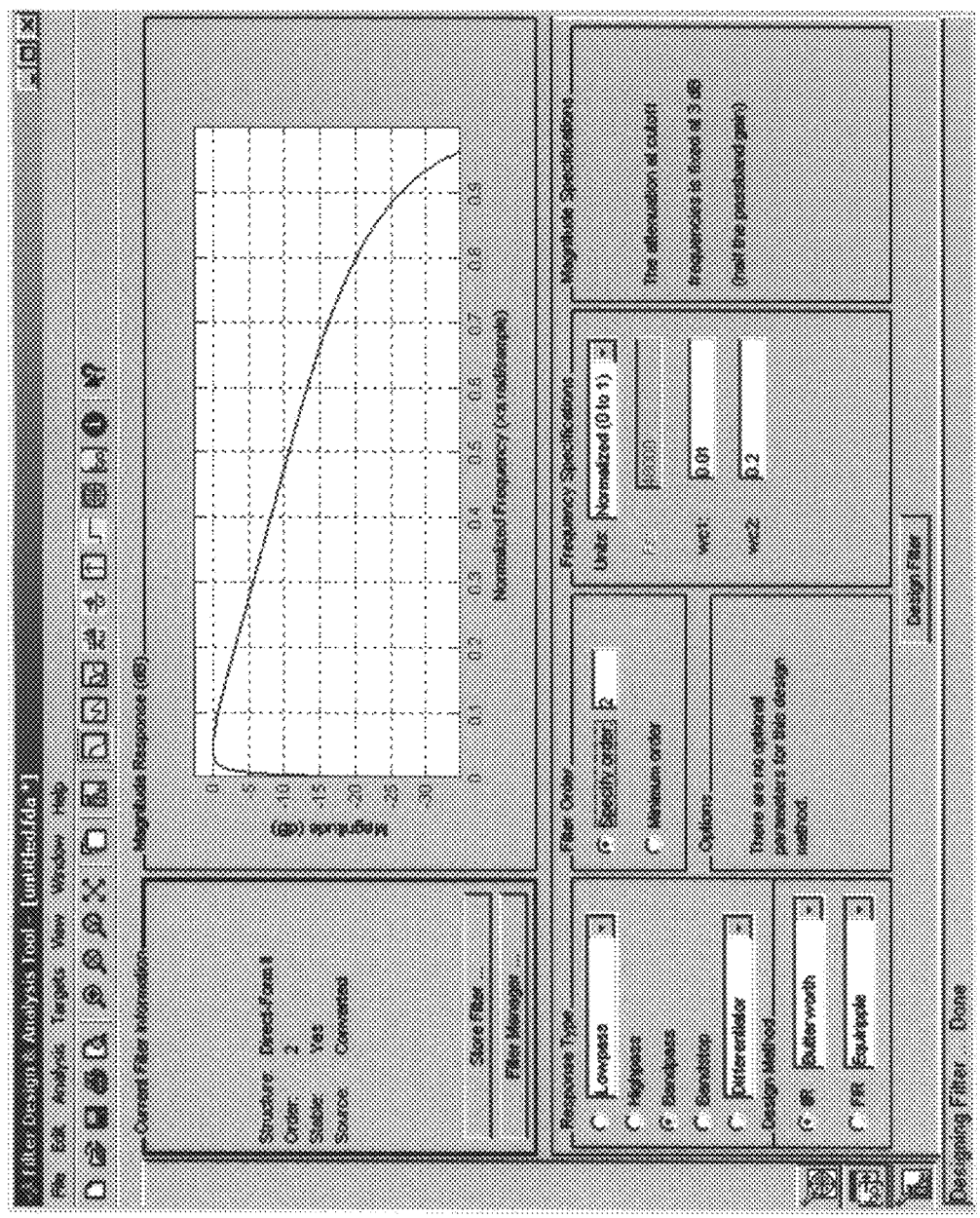
FIG. 20 shows an example magnitude response of an IIR Butterworth BPF, order 2, cut-off frequencies 0.01-0.2.
Figure 21:
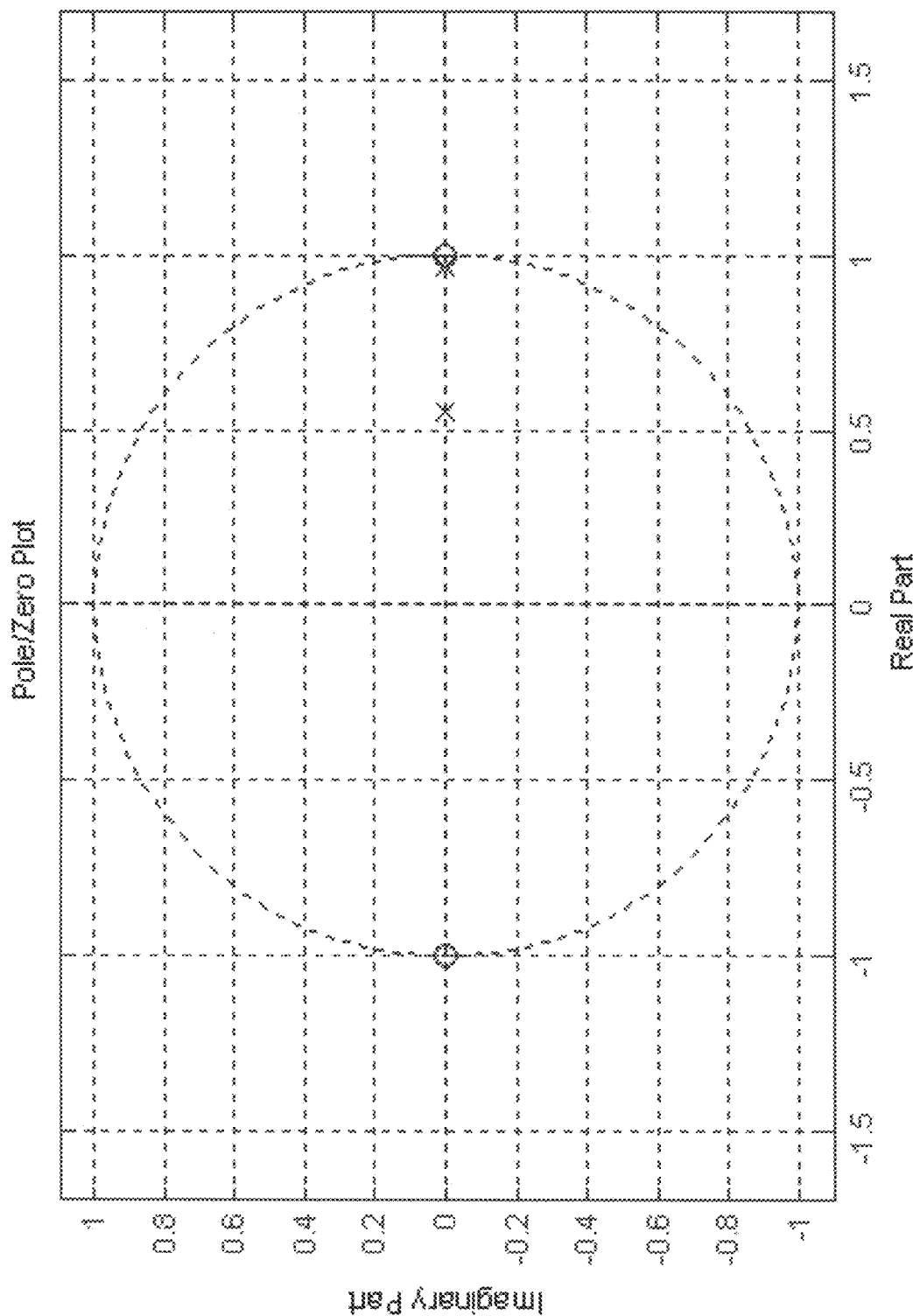
FIG. 21 is a zeroes-poles graphic illustration of a IIR Butterworth BPF, order 2, cut-off frequencies 0.01-0.2.
Figure 22:
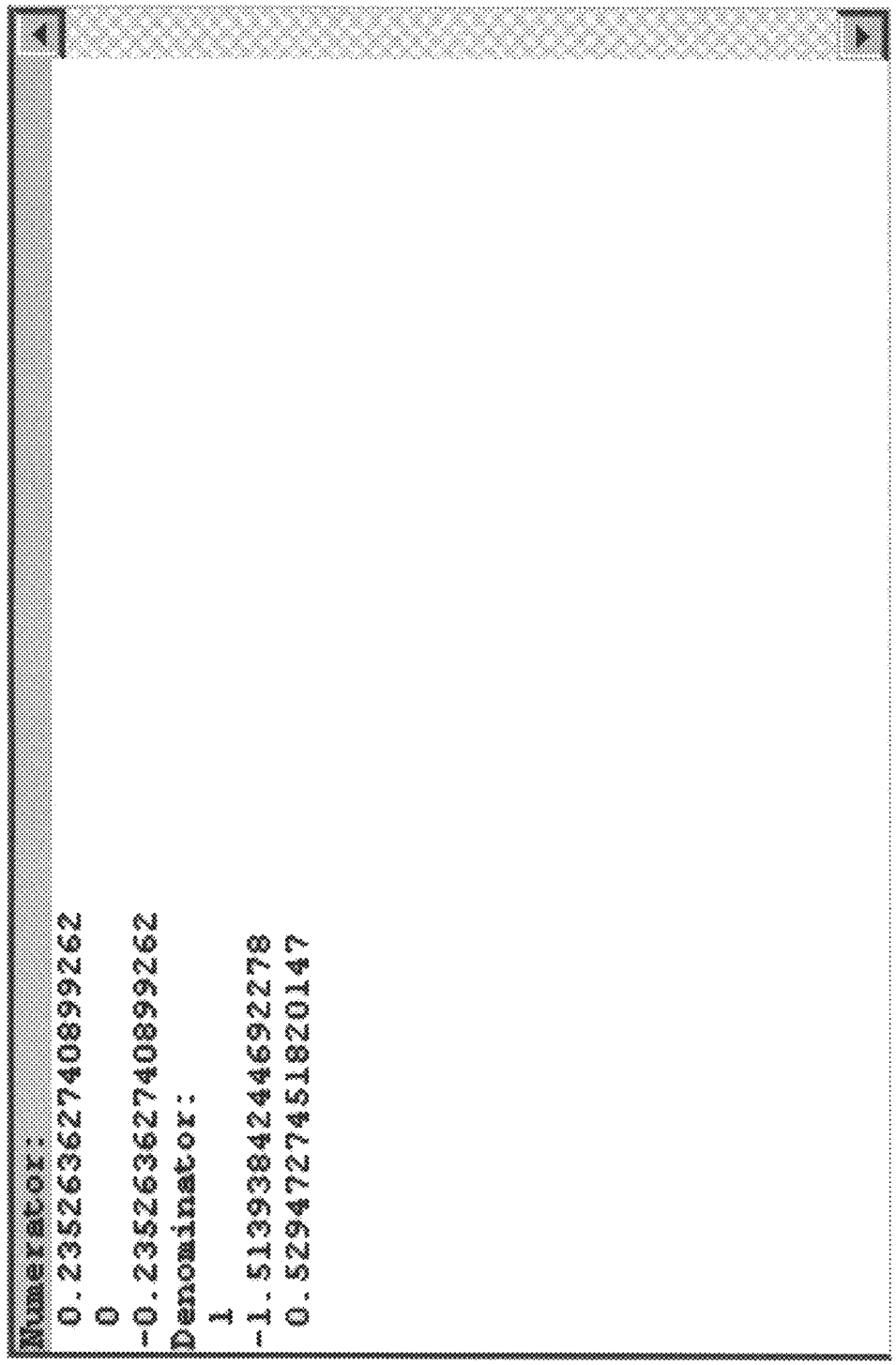
FIG. 22 gives example coefficients of a IIR Butterworth BPF, order 2, cut-off frequencies 0.01-0.2.

The magnitude response of a chosen filter, obtained with MatLab "Filter Design and Analysis Tool", is shown in FIG. 20; the zeroes-poles graph of the chosen filter is represented in FIG. 21; the generated coefficients are displayed in FIG. 22. FIG. 21 shows that zeros and poles are very close to the unitary circle, so the IIR filter is particularly sensitive to finite precision effects, mainly due to the feedback nature of the IIR structure.

1.2 Motion Blur

Figure 10:
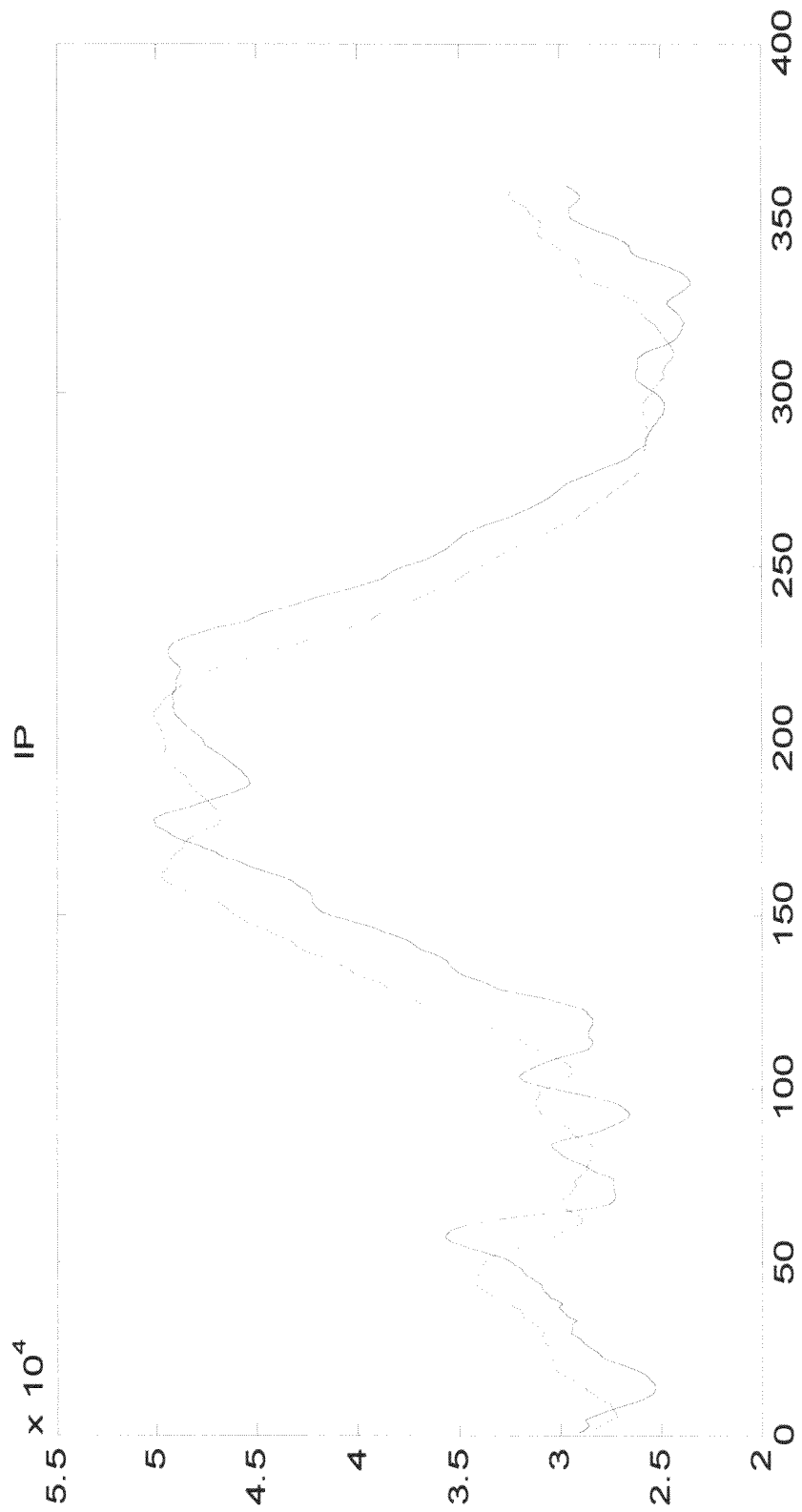
FIG. 10 shows an example of two successive characteristics curves in case of motion blur.
Figure 11:
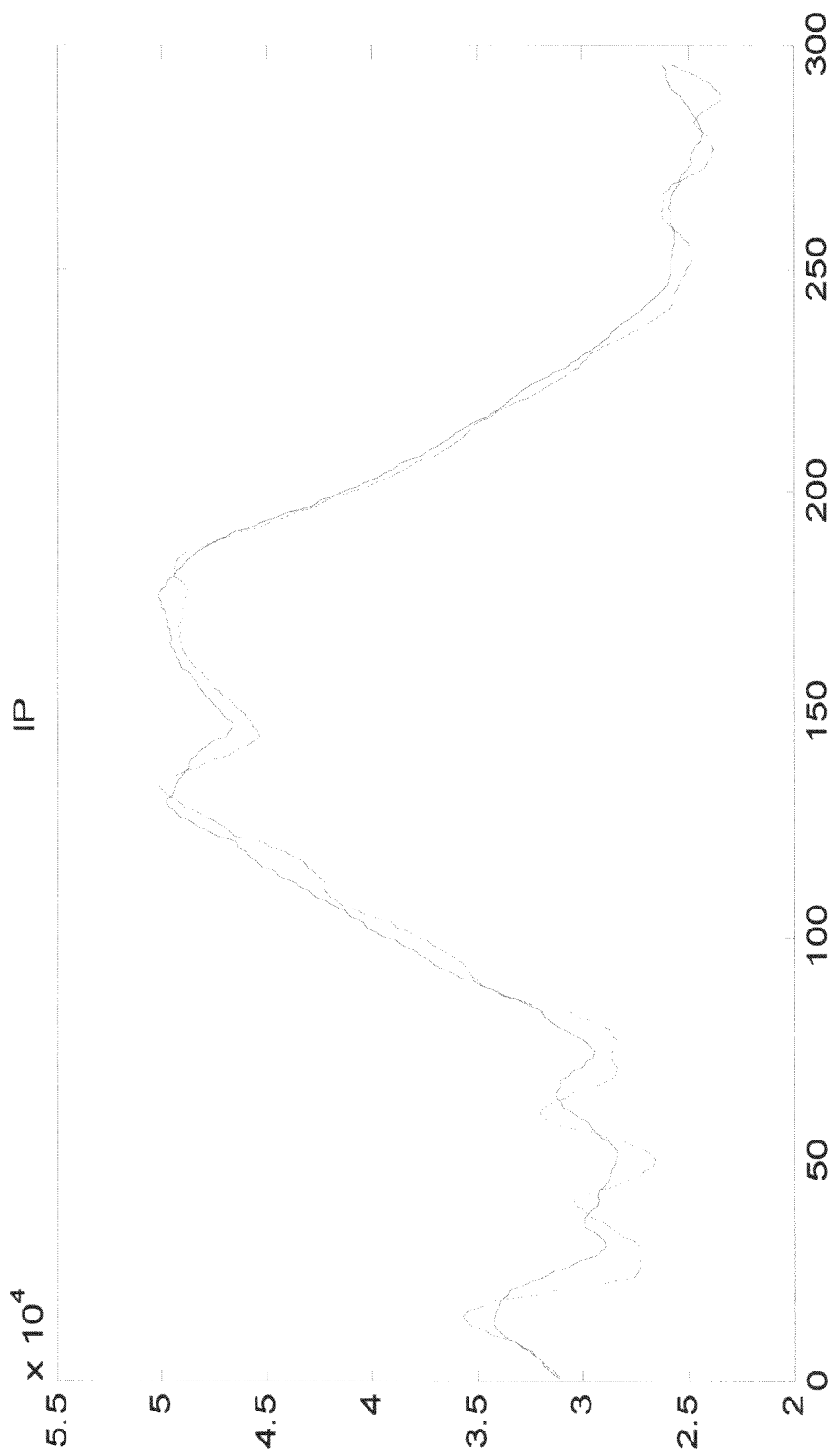
FIG. 11 shows example matching results with integral projection in case of motion blur (good matching=+11, instead of perfect matching=+13).

In the case of scene illumination changes a pre-filtering of the characteristics curves with a simple HPF works may work better than the known integral projection technique, but this may not be true in case of motion blur. To better understand the problem, reference is made to the two successive curves of FIG. 10, obtained for images corrupted by motion blur. With a known integral projection method, the matching is substantially correct (+11, instead of perfect matching +13), as shown in FIG. 11.

Figure 12:
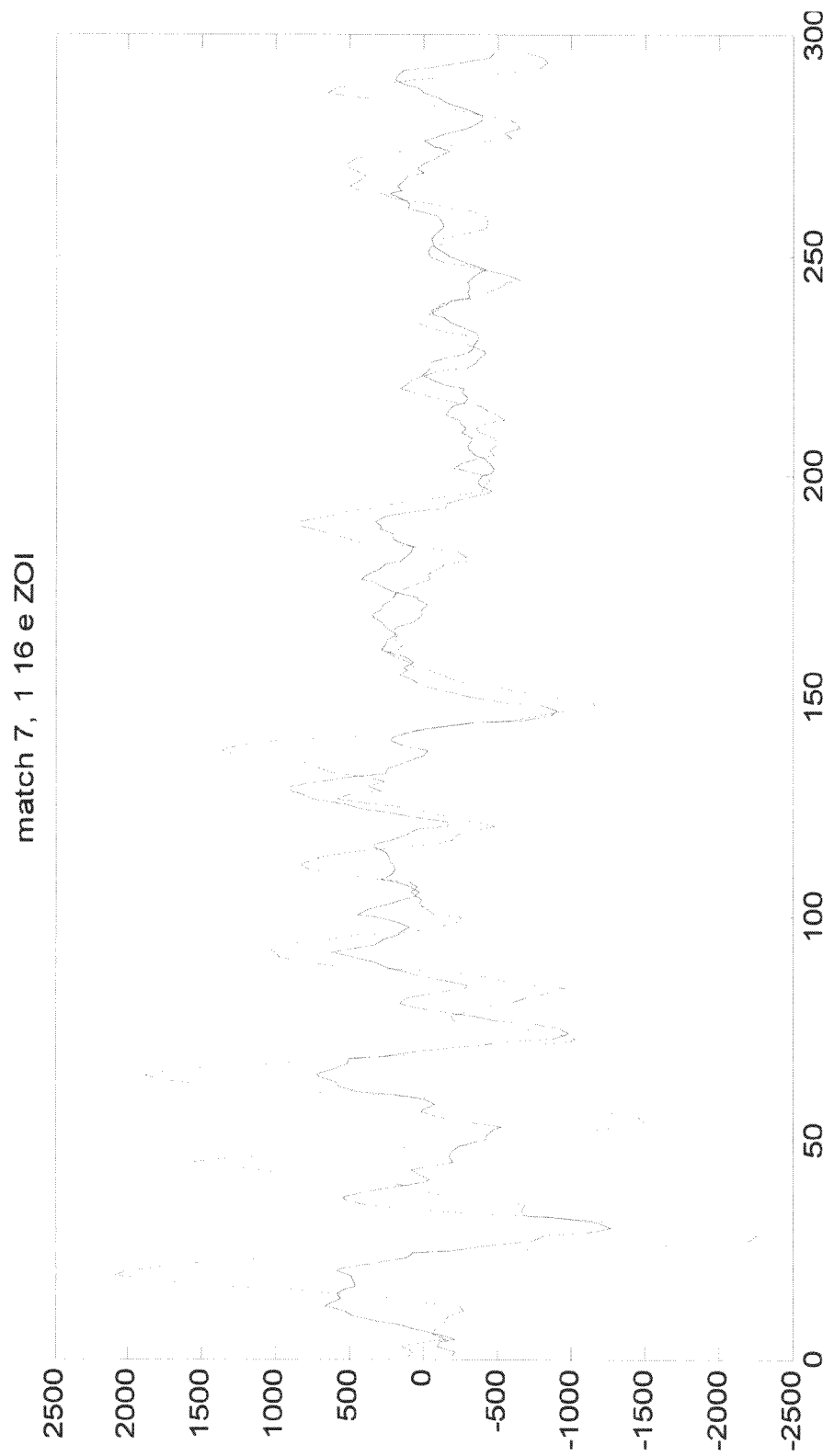
FIG. 12 shows example matching results obtained applying a simple HPF to the characteristics curves in case of motion blur (bad matching=+7).

Applying an embodiment of a simple HPF, for example as shown in Chapter 1.1 (that is 1−[1111111111111111]/16), an incorrect matching (+7) is obtained, mainly due to the very high frequencies, as reported in FIG. 12.

Figure 13:
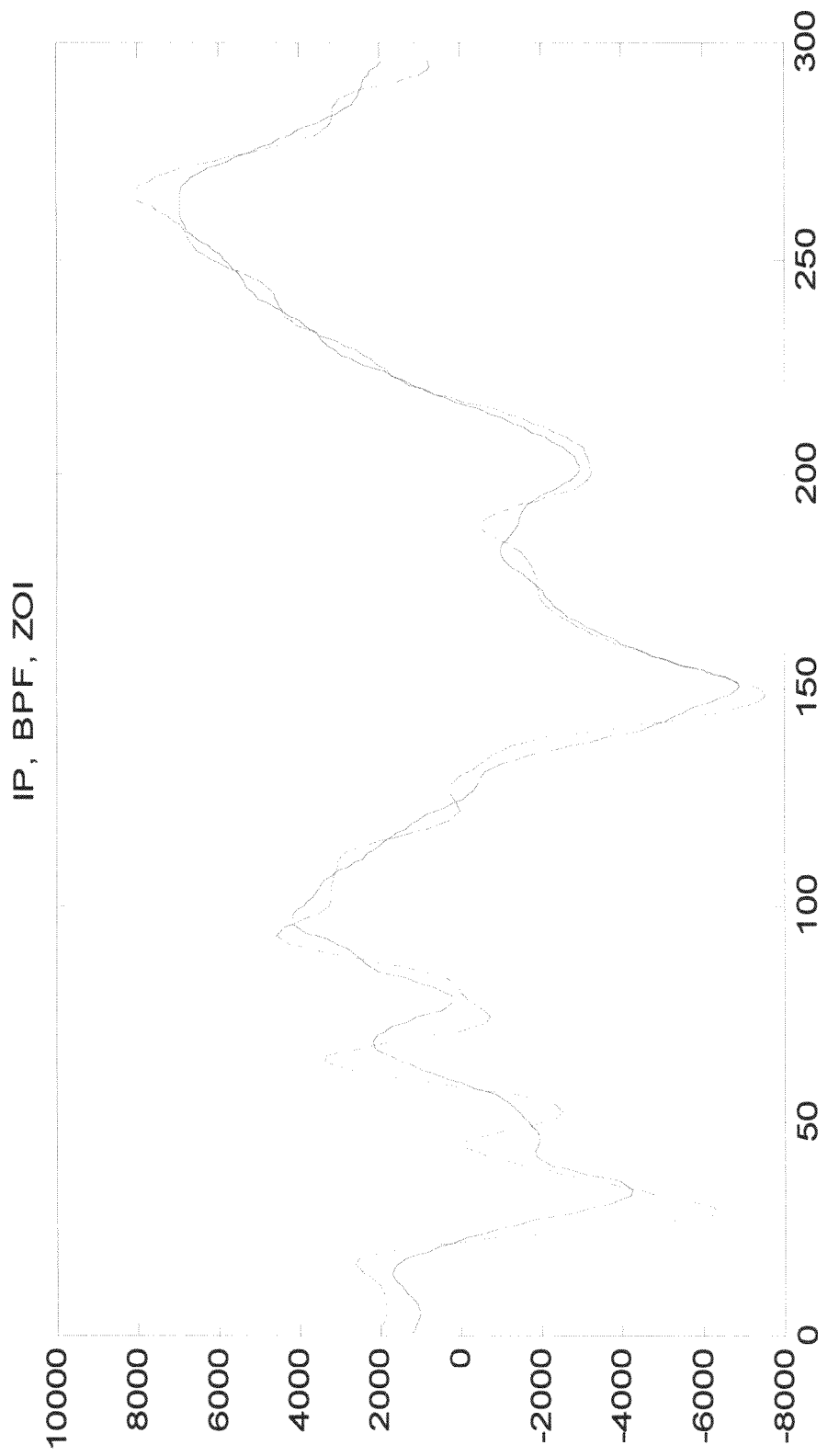
FIG. 13 shows example matching results obtained applying a IIR BPF to the characteristics curves in the case of motion blur (good matching=+11, instead of perfect matching=+13).

By contrast, a good matching (+11) is obtained, using a Butterworth IIR Band Pass Filter (BPF) as reported in FIG. 13. For this reason it may be preferred in some embodiments to use a BPF on the characteristics curve, because in this way good results in presence of both illumination changes and motion blur may be consistently obtained.

FIR Band pass filters ([1 0 −1], [−1 0 2 0 −1] are very simple, but are a less preferred solution in some embodiments because they cause a loss of quality of about 20-30%.

A BPF, which may produce better results, typically requires floating point multiplications (15 multiplications) or fixed point multiplication.

In an embodiment, FIR filters with integer multiplications may be used. A good approximation may be obtained using FIR filters, for example: [1 0 0 −1] and [1 8 28 56 70 56 28 8 1]. Combining these two filters the HPF filter: [−1 −8 −28 −55 −62 −28 28 62 55 28 8 1] is obtained. Also with this filter good results are obtained. Even if using a band-pass filter better results in objective evaluations are produced, an attendant problem using this filter (common to IIR filters) is a transient at the beginning. This is particularly visible in the case of regular pattern filter. By contrast, this problem does not generally manifest itself with the FIR, which is more stable.

1.3 Matching+ZOI

Referring to FIG. 4, the matching and zone of interest (ZOI) control block 408 is configured to reduce undesired effects in case of new different details, regular pattern and moving objects coming into the scene. Typical Integral Projection techniques suffer from this kind of problems. The matching and zone of interest control block 408 may be configured to perform the methods described below.

1.3.1 Matching

In an Integral Projection method, horizontal and vertical displacements between the two successive curves may be computed using eq. (2), but this formula can lead to misalignments in particular cases.

Figure 14:
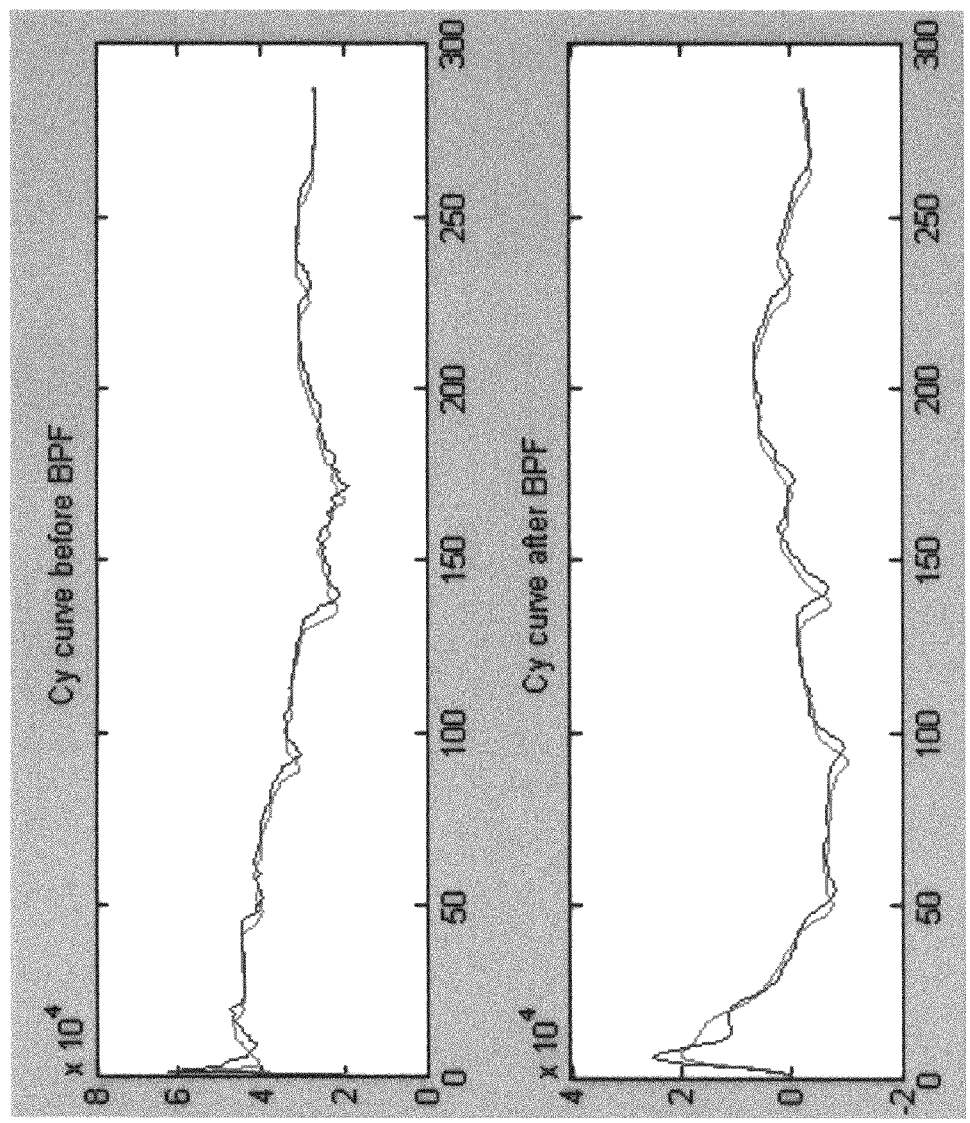
FIG. 14 shows example characteristics curves before and after the BPF, using the classical matching (bad matching=0).

The effect of new different details coming into the scene when using a BPF pre-filtering, as described in the previous chapter may be observed in FIG. 14, where an incorrect matching with 0 instead of correctly with +4, is evident.

An embodiment of a matching method, that does not take into account the cropping of the margins of the characteristics curves in the matching process, has been found. According to an embodiment, the following formula may be used:

$$P(s) = \frac{1}{M - |s|} \sum_{j=max(croppingX,-s)}^{min(size\_x-s,size\_x)} \alpha_j |C_x(j) - C'_x(j+s)| \quad (5)$$

$$rgmv_x = \{s' : P(s') = \min P(s)\}$$

$$B(s) = \frac{1}{N - |s|} \sum_{i=max(croppingY,-s)}^{min(size\_y-s,size\_y)} \beta_i |C_y(i) - C'_y(i+s)|$$

$$rgmv_y = \{s' : B(s') = \min B(s)\}$$

where size_x=M−(croppingX<<1) and size_y=N−(croppingY<<1).

Figure 15:
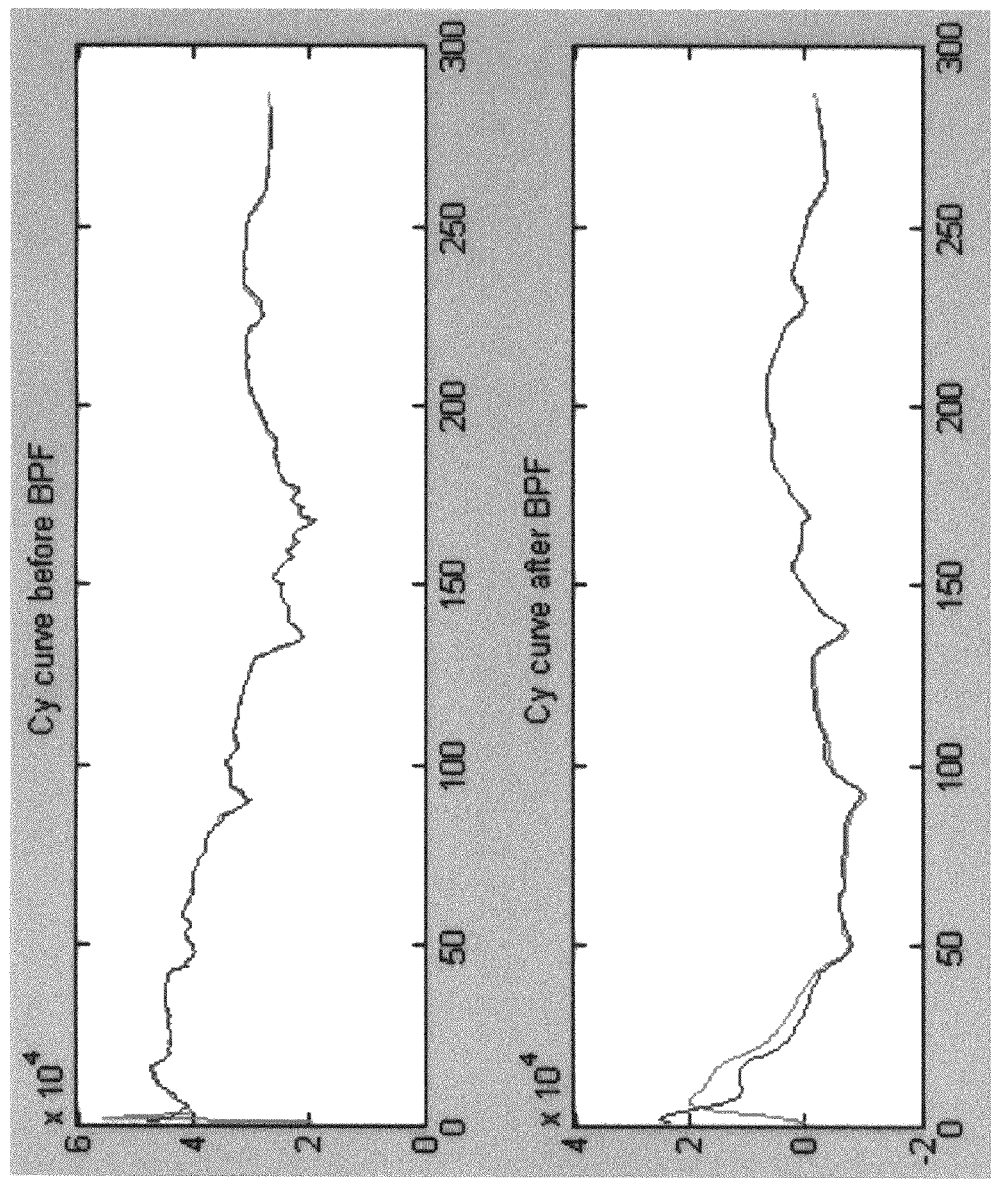
FIG. 15 shows example characteristics curves before and after the BPF, using the proposed matching (perfect matching=+4).

The parameters $\alpha_j$ and $\beta_i$ allows modulation of the ZOI profile, as will be described in Chapter 1.3.2. The correct matching, obtained with eq. (5) is shown in FIG. 15.

Figure 16:
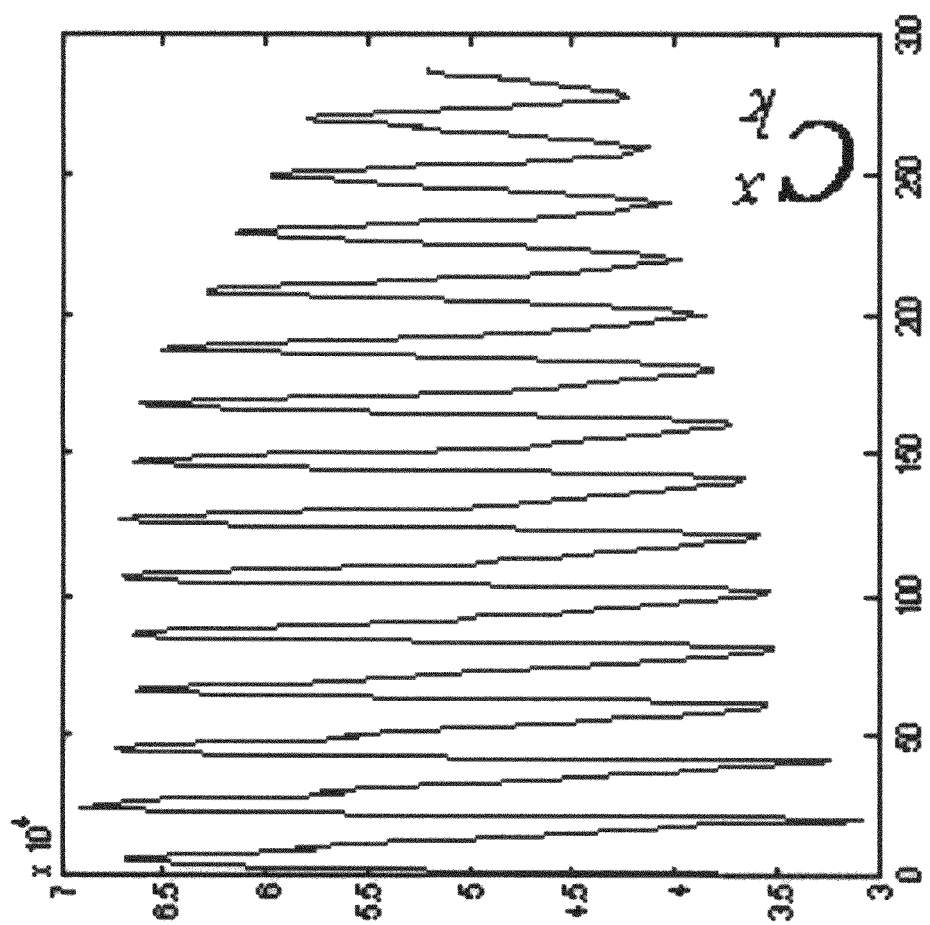
FIG. 16 shows an example characteristic horizontal curve of a frame with regular pattern.

In case of regular patterns, characteristic curves can have a regular behavior, as indicated in FIG. 16. In this case, in the matching curve there may be more than one global minimum, as shown in FIG. 17. In this case the lowest minimum (in absolute value) may be preferably considered.

In an embodiment, pattern handling may be obtained considering two successive minima on the matching curve (min1 and min2) and the maximum (max1) comprised between these two minima. Considering the percentage:

$$P=(|min1-min2|)/(max1-min(min1,min2)) \quad (6)$$

If the percentage P is less then a threshold T, the selected new minimum may be the one with the lower position (in absolute value), otherwise the selected new minimum will be normally selected (the minimum between min1 and min2). This may prevent the selection of a wrong local minima. Experimental results demonstrate that a good value for T is 0.15.

1.3.2 ZOI

In an embodiment Zone Of Interest (ZOI) control is performed to discriminate background motion from inner motion of objects in the scene. In one embodiment, which may be more practical, horizontal and vertical curves are divided in three equal zones, assigning a heavier weight to the outer zones. Theoretical and practical implementations are depicted in FIG. 18 and FIG. 19. The experimentally obtained weights, are respectively 4 1 4 for the three zones in both horizontal and vertical directions.

1.4 Video Cam Mode

The web/video cam mode block 410 is optional and can be configured to remove unintentional motion from a video sequence. In an embodiment, unintentional motion may be removed by high-pass filtering the motion vectors. According to an embodiment, this high-pass filtering may be carried out with a 2nd order Butterworth IIR high-pass filter, Direct form II, with cutoff frequency of 0.40 Hz.

It should be noticed that the IIR filter may cause oscillations in case the camera is stopped, while doing a panning. In an embodiment, this problem may be resolved by stopping the filter with no or minimal delay when the inputs taps are zeros.

Figure 23:
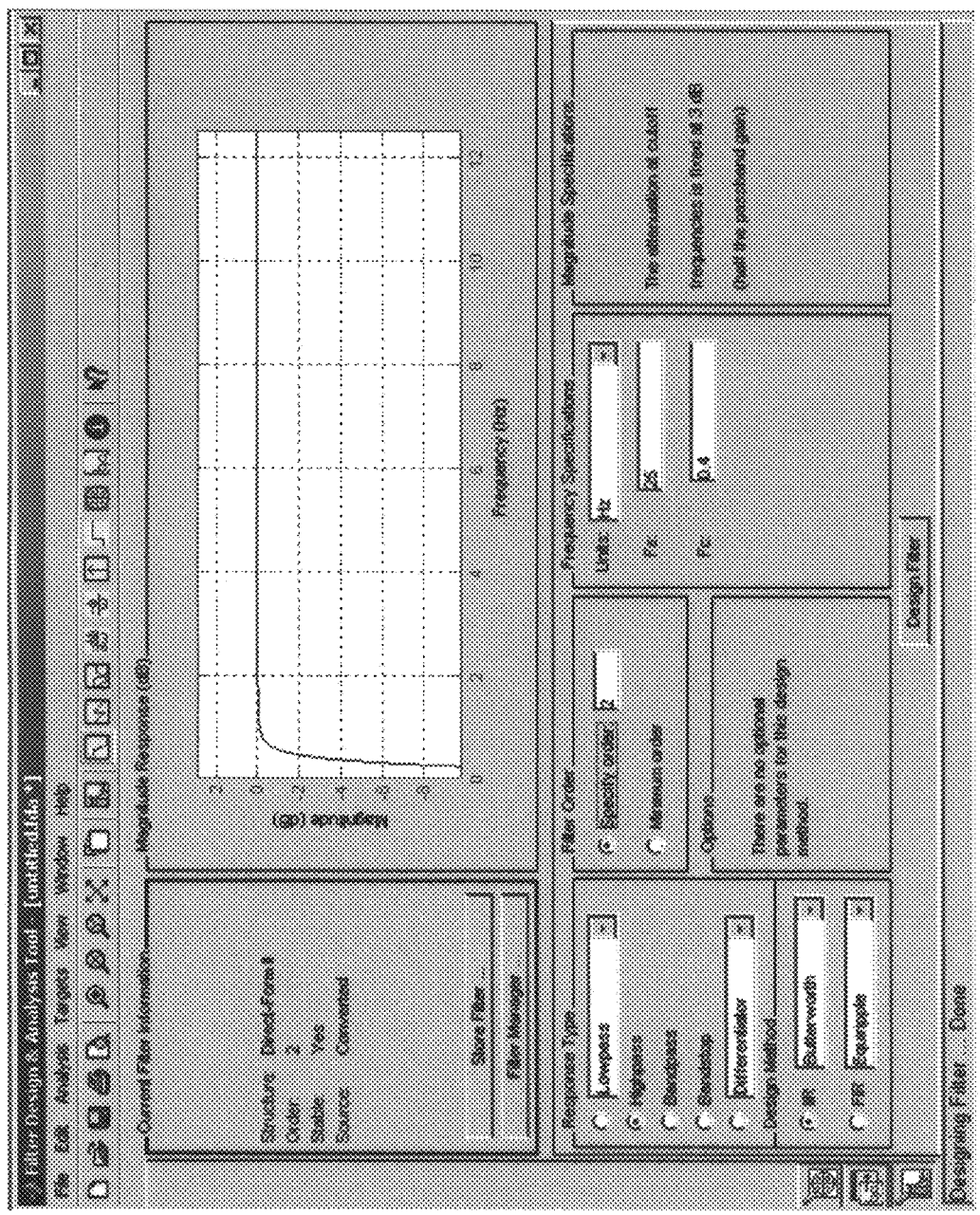
FIG. 23 shows an example magnitude response of the IIR Butterworth HPF, order 2, cut-off frequency 0.4.
Figure 24:
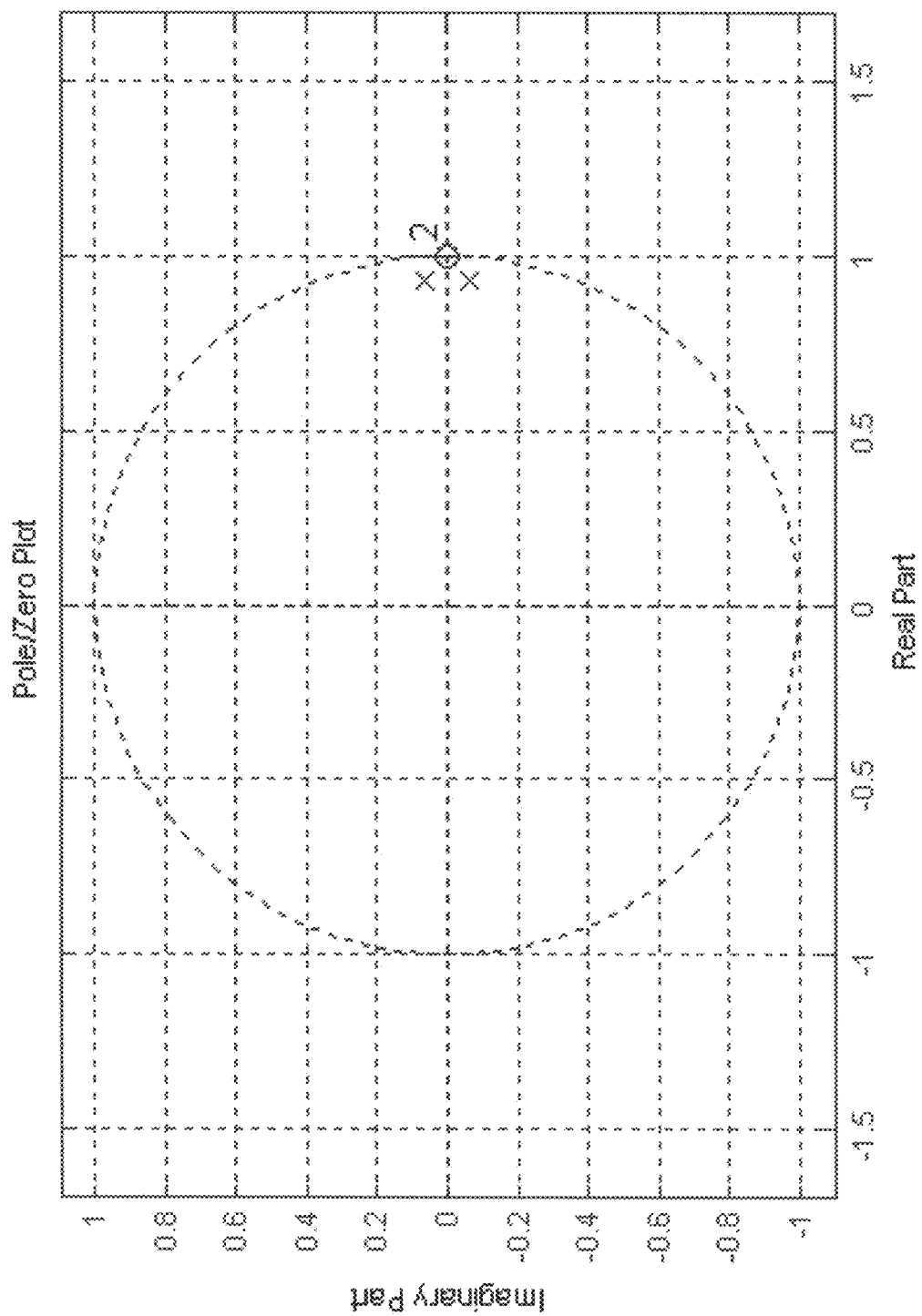
FIG. 24 is a zeroes-poles graphic illustration of a IIR Butterworth HPF, order 2, cut-off frequency 0.4.
Figure 25:
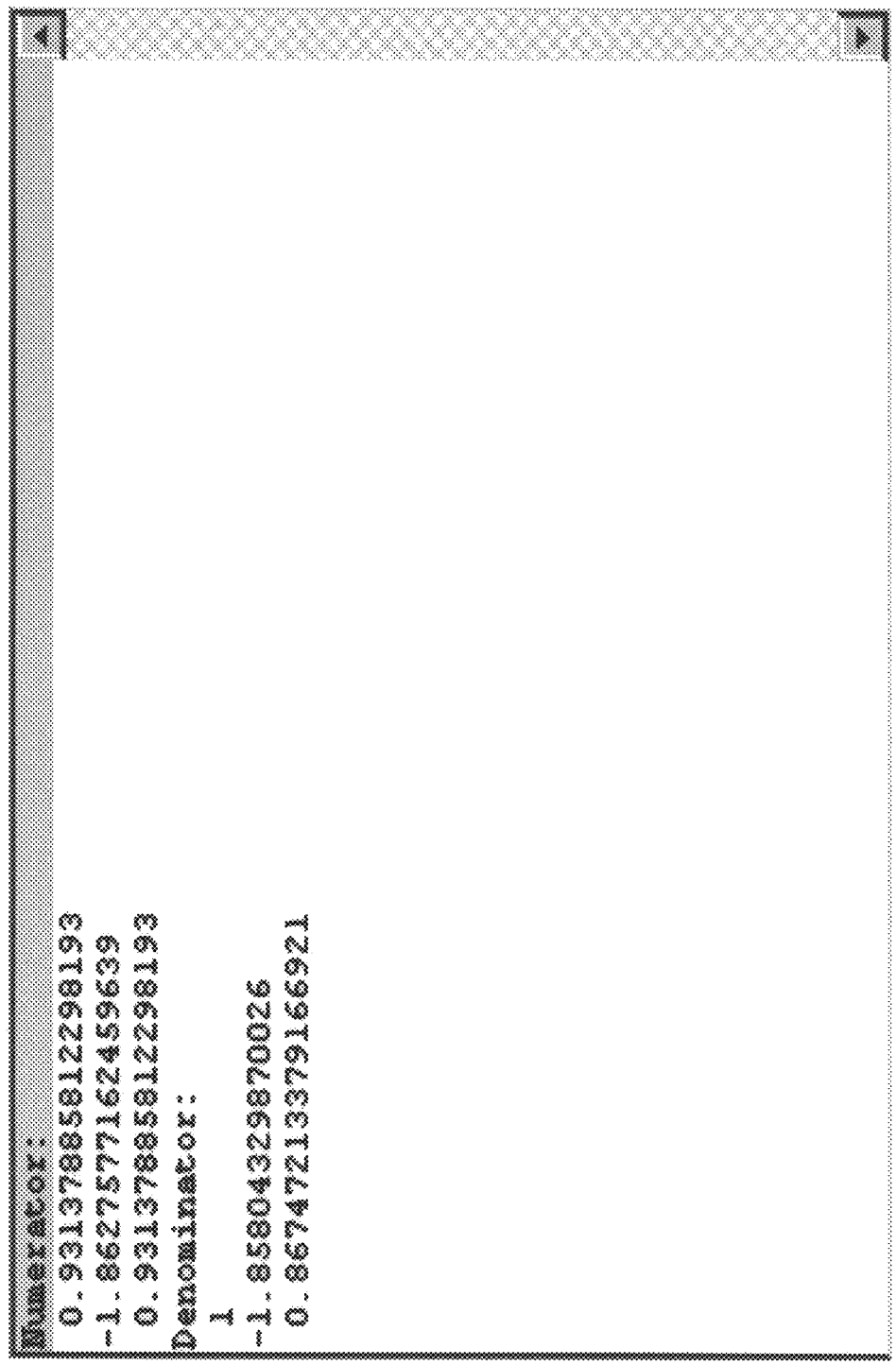
FIG. 25 gives example coefficients of a IIR Butterworth HPF, order 2, cut-off frequency 0.4.

The magnitude response of an example chosen filter, obtained with MatLab "Filter Design and Analysis Tool", is shown in FIG. 23. The zeroes-poles graph of the chosen filter is represented in FIG. 24, and the generated coefficients are displayed in FIG. 25. FIG. 24 shows that zeros and poles are very close to the unity circle, therefore the IIR filter may be particularly susceptible to finite precision effects, mainly due to the feedback nature of the IIR structure itself.

2. Operations Count

Table 1 and Table 2, below, show the operation count made for each block of a proposed embodiment. While in Table 1 operations for the various blocks (curve generation 404, signal processing 406 and matching+ZOI 408) are indicated per pixel, in Table 2 the operations for the various blocks (HPF and stabilization) are indicated per frame, so numerically almost insignificant. In Table 1 the symbols W, H and S represent respectively the frame width, frame height and the search window. The terms written in light characters into these tables are negligible.

As a practical example, in Table 3 are reported the results for a ST850 sensor (W=2056 H=1544), considering a margin loss of about 7% of the frames (S=32).

3. Proposed Architecture

Figure 26:
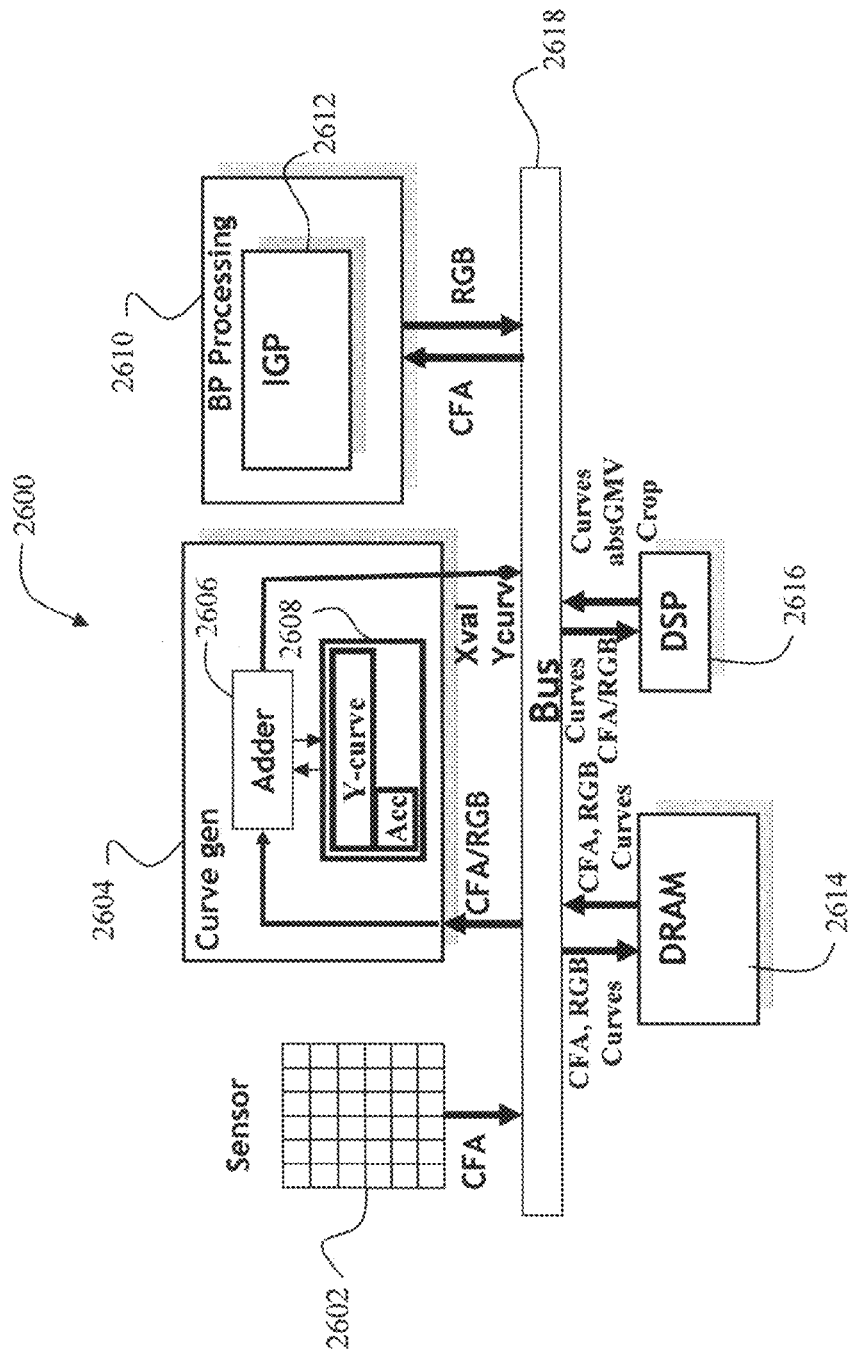
FIG. 26 shows a proposed block diagram of an embodiment of a system for processing digital images.

The function of every block can be implemented via software. Of course, hardware accelerators may be employed, for example, to increase performance, in particular for Curve generation, BPF and HPF functions. A hardware embodiment of a system 2600 is depicted in FIG. 26.

The meaning of the functional circuit blocks and signals is given in the following table:

| | |
|---|---|
| CFA | input frame, for example, in Bayer format |
| RGB | input frame in the RGB domain |
| Sensor | Image sensor |
| Curve Gen | Block adapted to generate the curves defined in eq. (1) |
| Curves | Horizontal and vertical curves defined in eq. (1) |
| absGMV | absolute Global Motion Vector |
| Acc | memory cell |
| Y-curve | line memory |
| Xval | current X value |
| Crop | the cropped image |

The system 2600 comprises a sensor 2602 configured to sense images and produce input frames, for example, in Bayer format; a curve generator 2604 configured to generate characteristic curves from image frames, for example from frames in Bayer and/or RGB format, and as illustrated having an adder 2606 and a memory 2608 configured to store a Y-curve line; an image processor 2610, as illustrated a Bayer image processor configured to generate RGB frames from Bayer image frames and having an image generation pipeline 2612; a memory 2614 configured to store CFA frames, RGB frames and characteristic curves; a digital signal processor 2616 and a bus system 2618.

Figure 27:
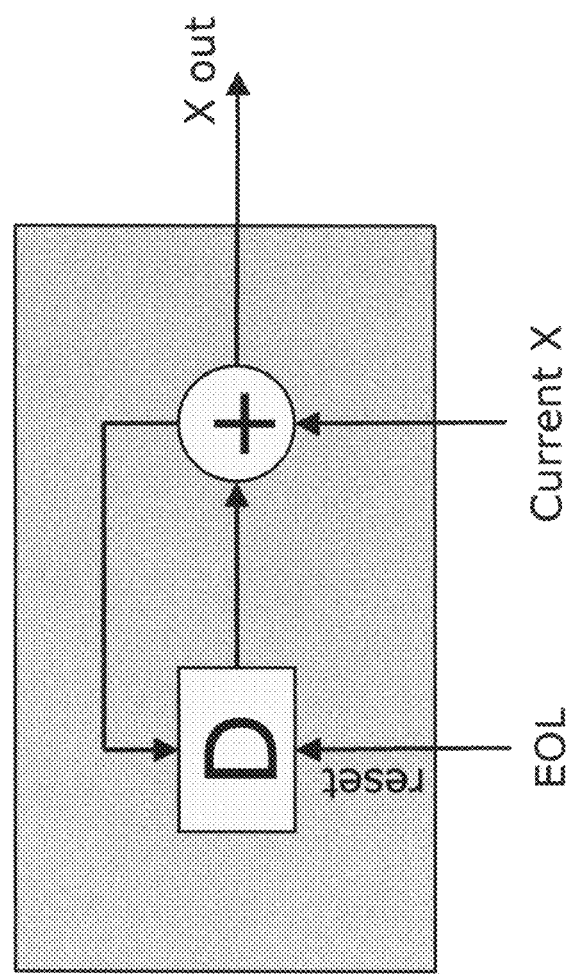
FIG. 27 shows an embodiment of a curve generation block.

Being the curve generation block Curve Gen hardware implemented, the X curves are generated just accumulating the pixels of each line using a delay block D, as depicted in FIG. 27, while Y curves utilize a line memory Y-curve, with a similar accumulation scheme.

An embodiment of a method for video stabilization is relatively simple from a computational point of view and may be used for real-time processing. Moreover, In an embodiment the method may be:

Relatively insensitive to noise and rolling shutter distortions;
Robust to illumination changes;
Robust to motion blur;
Relatively insensitive moving objects entering in the scene;
Capable to track user's intended motion.

4. Stabilization

An embodiment of a methodbased on motion estimation through horizontal and vertical characteristics curve may be employed. See Y. Koo and W. Kim, "An Image Resolution Enhancing Technique Using Adaptive Sub-Pixel Interpolation For Digital Still Camera System", *IEEE Transactions On Consumer Electronics*, Vol. 45, No. 1., February 2005.

4.1 Motion Estimation

Motion estimation may be applied on sequences of YUV or RGB images, calculating the characteristics curves, for example, only on luminance or green pixels.

Embodiments may be implemented on Bayer Pattern data, and may be computed only on green pixels, using the extraction check board pattern scheme of FIG. 31. Of course, other color channels may be considered. To maintain the Bayer pattern consistency (i.e., the GR, BG or similar configuration), the estimated horizontal and vertical offsets may be forced to be multiple of 2. Experimental results reveal that motion estimation on Bayer patterns is accurate, the results well compare with those of RGB motion estimation with a difference of [−1,+1], due to the above indicated consistency constraint.

4.1.1 Motion Estimation with RCF

An embodiment of a motion estimation method may utilize the following formula (9), where max_s is the maximum allowed shift:

$$P_h(s) = \sum_{j=max\_s}^{M-max\_s} \alpha_j |RCF_v^{F1}(j) - RCF_v^{F2}(j+s)| \quad (9)$$

$$off_h = \{s': P_h(s') = \min P_h(s)\}$$

$$P_v(s) = \sum_{i=max\_s}^{N-max\_s} \beta_i |RCF_h^{F1}(i) - RCF_h^{F2}(i+s)|$$

$$off_v = \{s': P_v(s') = \min P_v(s)\}$$

where the parameter RCF for the frame F in horizontal, the parameters $\alpha_j$ and $\beta_i$ allows modulating the ZOI profile, as described in the Chapter 1.3.2, and vertical direction is defined as follows:

$$RCF_h^F(j) = \sum_{i=1}^{m} p_{ij} \quad (10)$$

$$RCF_v^F(i) = \sum_{j=1}^{n} p_{ij}$$

This embodiment avoids having different numbers of elements to test for matching at the beginning and at the end of the curve.

4.1.2 Hardware

Figure 28:
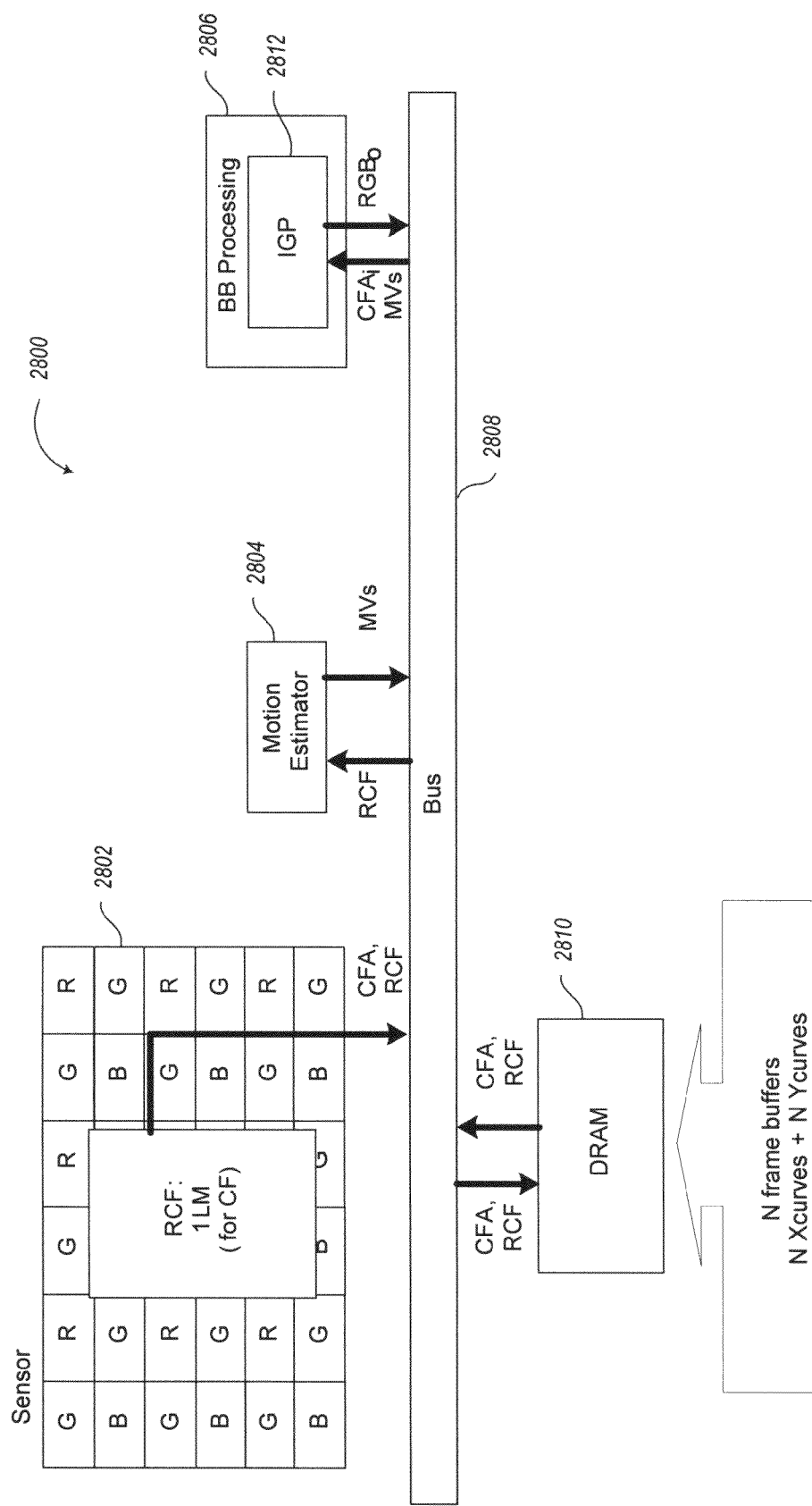
FIG. 28 shows a functional block diagram for an embodiment of a system for processing green pixels of Bayer patterns, integrated with a sensor.

A block scheme of an embodiment of a system 2800 configured to estimate motion using green pixels of Bayer patterns is depicted in FIG. 28. The meaning of the blocks and the signals illustrated in FIG. 28 is reported in the following table:

| | |
|---|---|
| RCF | rows/columns feature content |
| 1LM | One Line Memory |
| BP Processing | Pipeline for processing Bayer pattern images |
| IGP | Image Generation Pipeline |
| CFA | input frame input frame in Bayer format |
| RGBo | interpolated output frame in the RGB domain |
| MVs | Motion Vectors |

A sensor 2802 is configured to perform raster processing and provides rows/columns feature content curves RCF (X and Y curves) and input frames CFA in Bayer format. The sensor 2802 is coupled to a bus system 2808. A memory DRAM 2810 is coupled to the bus system 2808 and configured to store N CFA input frames, N RCF X curves and N RCF Y curves. A motion estimator 2804 is coupled to the bus system 2808 and configured to generate motion vectors MV based on RCF curves. A digital image processor 2806, which as illustrated is configured to perform Bayer imaging processing, is coupled to the bus system 2808. The image processor 2806 comprises an image generation pipeline 2812.

Figure 29:
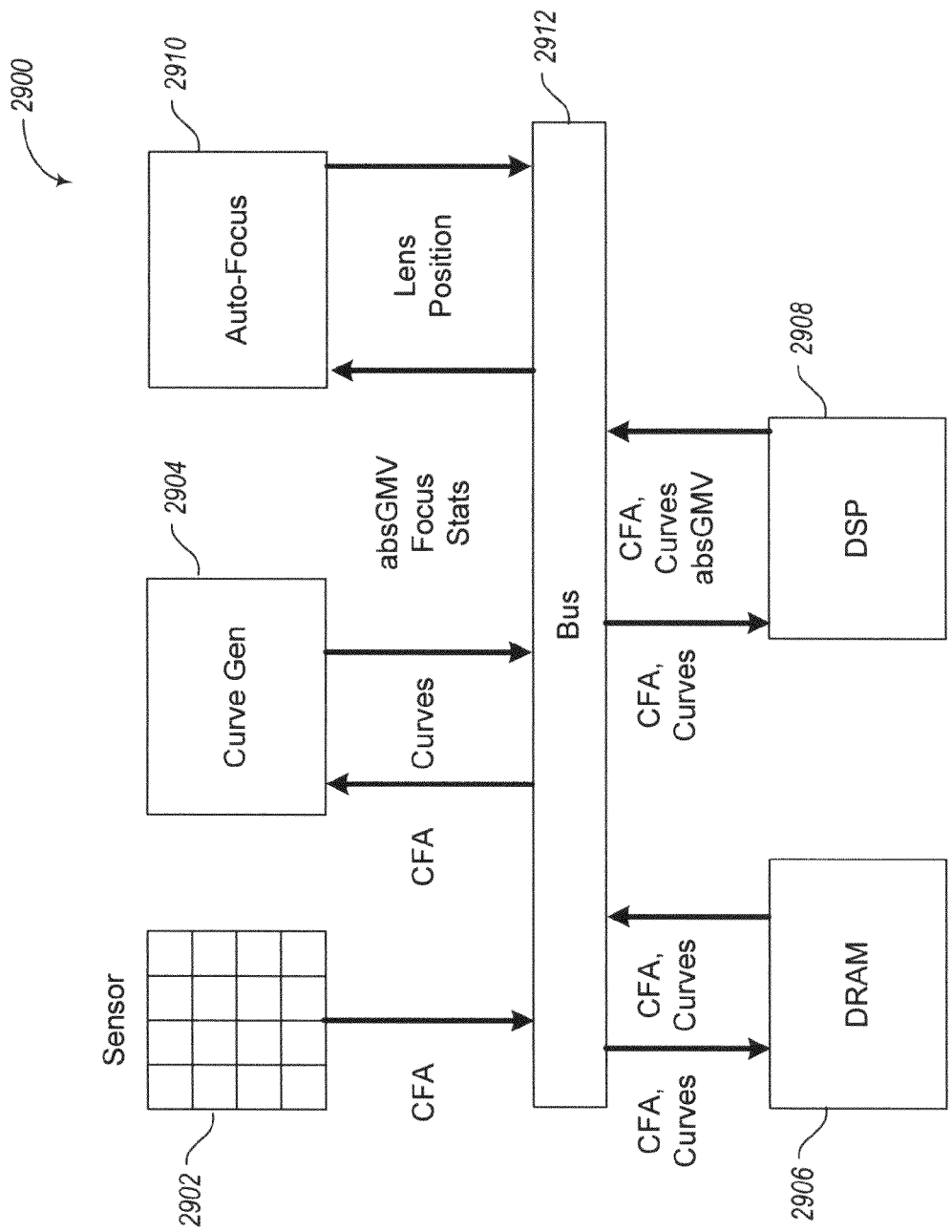
FIG. 29 shows a functional block diagram of an embodiment of an auto-focusing system.
Figure 30:
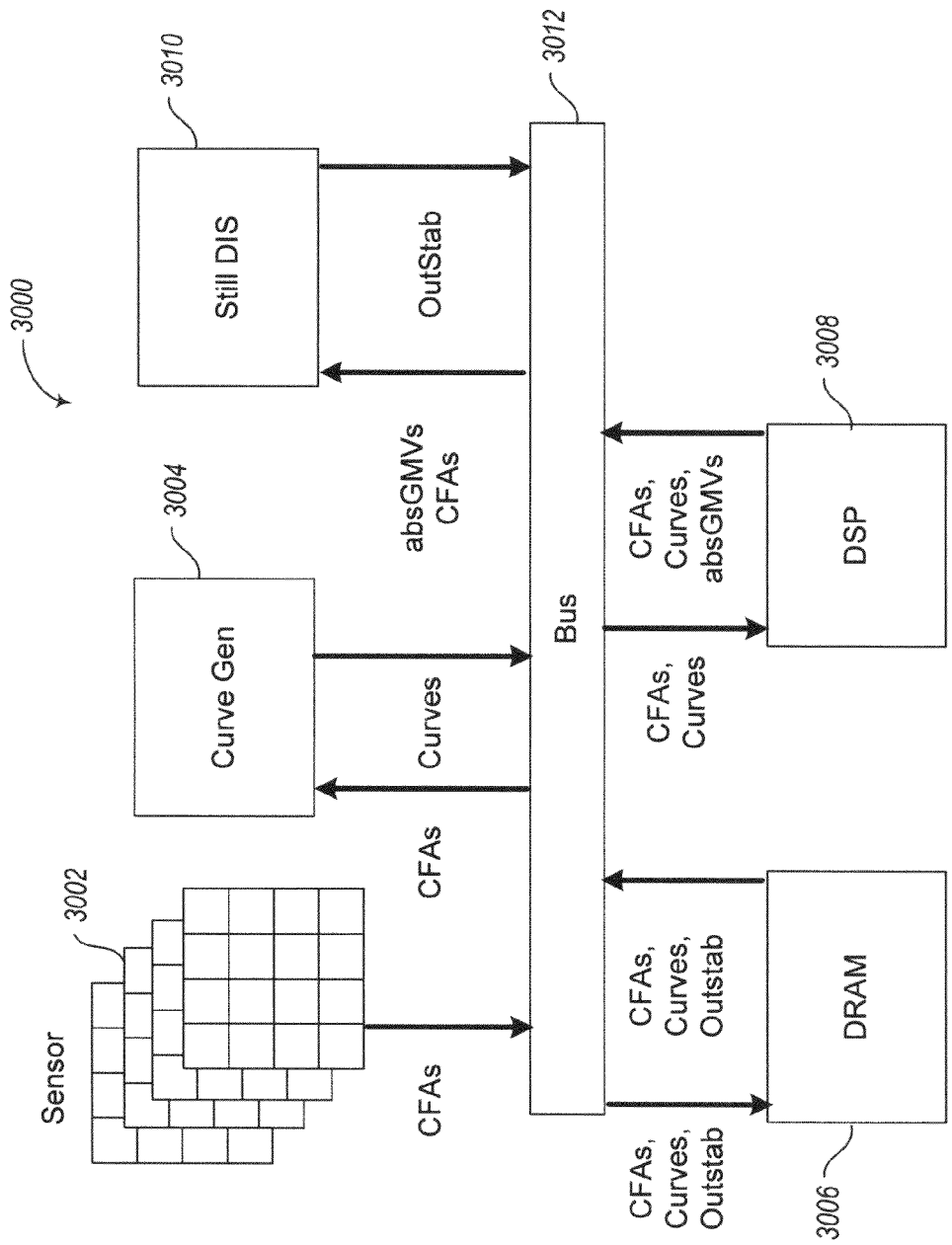
FIG. 30 shows a functional block diagram of an embodiment of a still-video digital image stabilization system.

Embodiments of the systems and methods described herein, such as the embodiments depicted in FIG. 28, may be implemented in a dedicated hardware device or in other hardware systems, such as in an auto-focus system as depicted in FIG. 29, or in a still-video digital image stabilization device as depicted in FIG. 30.

The meaning of the blocks and of the signals depicted in FIGS. 29 and 30 is stated in the following table:

| | |
|---|---|
| Curve Gen | Block adapted to generate the curves defined in eq. (10) |
| CFA | input frame in Bayer format |
| Curves | Horizontal and vertical curves defined in eq. (10) |
| absGMV | absolute Global Motion Vector |
| Lens Position | Output lens position |
| Focus Stats | Focus Statistics |
| Sensor | Image sensor |
| OutStab | Output stabilized frame |

FIG. 29 illustrates an embodiment of an auto-focus system 2900. The system 2900 comprises an image sensor 2902 configured to generate input frames, for example, in Bayer format, a curve generator block 2904 configured to generate RCF X curves and RCF Y curves based on the CFA frames, a memory 2906 configured to store CFA frames, RCF X curves and RCF Y curves, a digital signal processor 2908 which may be configured to receive CFA frames, RCF X curves and RCF Y curves and to output CFA frames, RCF X curves, RCF Y curves and absolute Global Motion Vectors absGMV and to generate control signals, such as signals to control the curve generator, an auto-focus block 2910 configured to generate lens position control signals based on the motion vectors and focus statistics (which may, for example, be generated by the sensor or retrieved from the memory or combinations thereof, and a bus system 2912 configured to couple the system components together.

FIG. 30 illustrates an embodiment of a still-video digital image stabilization system 3000. The system 3000 comprises an image sensor 3002 configured to generate input frames, for example, in Bayer format, a curve generator block 3004 configured to generate RCF X curves and RCF Y curves based on the CFA frames, a memory 3006 configured to store CFA frames, RCF X curves and RCF Y curves, a digital signal processor 3008 which may be configured to receive CFA frames, RCF X curves and RCF Y curves and to output CFA frames, RCF X curves, RCF Y curves and absolute Global Motion Vectors absGMV and to generate control signals, such as signals to control the curve generator, a digital image stabilization block 3010 configured to generate a stabilized output frame based on the motion vectors and CFA frames, and a bus system 3012 configured to couple the system components together.

4.1.3 Motion Estimation with Fast Search

Figure 32:
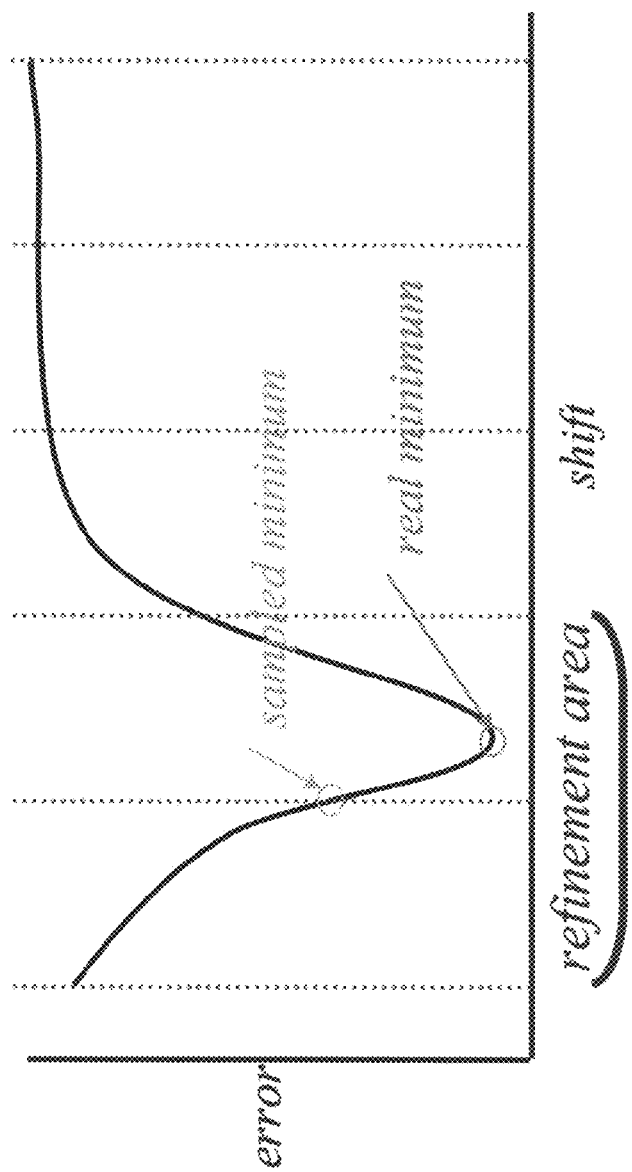
FIG. 32 illustrates an embodiment for searching for a minimum.

Usually there is just one global minimum on curves obtained with an Integral Projection algorithm. After dividing the interval of research in parts N, the real minimum of the curve can be searched around the sampled minimum, reducing drastically the number of steps needed as indicated in FIG. 32.

Considering a search window SW, an embodiment of a fast search method comprises the following number of steps Fast, with N chosen opportunely to minimize the needed steps:

$$\text{Fast} = \text{POW}(2, N+1) + (\text{SW}/\text{POW}(2, N-1)) - 1 \quad (11)$$

$$\text{Fast} = \text{POW}(2, N+1) + (\text{SW}/\text{POW}(2, N-1)) - 1 \quad (11)$$

wherein $\text{POW}(2, N) = 2^N$.

The optimal N, like indicated in Table 8, is:

$$N = \begin{cases} 2 & \text{for } 8 \leq SW \leq 32 \\ 3 & \text{for } 32 < SW \leq 128 \end{cases} \quad (12)$$

Using an embodiment of a fast search method, the following improvements may be obtained in respect to a typical full search:

17.64% for SW=8;
45.45% for SW=16;
60.00% for SW=32;
73.64% for SW=64;
80.54% for SW=12.

In Table 4, below, Full means full search steps, that is Full=(SW·2)+1, while Fast means fast search steps, that is Fast=POW(2,N+1)+(SW/POW(2,N−1))−1.

4.2. Computational Improvement

Table 5, below, summarizes the operation counts for the prior art and an embodiment of the proposed fast method, considering the various optimization steps, with an input Bayer Pattern image of dimensions (W×H) and a search window for the Motion estimation of SW pixels.

Table 6 reports results obtained for the sensor ST 850, considering an input Bayer Pattern image of size (W×H)= (2056×1544) and a search window for the Motion estimation of SW=32 pixels, with a margin loss in Motion estimation of about 7%. Looking at Table 4, the optimal value for N is 3 or 4, thus in Table 4, Full=65, Fast=23. The overall improvement in terms of number of operations using the final proposed method is about 51.83%.

An embodiment of a motion estimation technique may be applied on Bayer patterns, thus it can be easily added, as a pre-processing step, before any Image Generation Pipeline. It may also be applied on YUV or RGB images as a post-processing step.

The method is low cost and low power demanding thus it is particularly suited for real-time processing.

The description of illustrated embodiments, including what is described in the Abstract and claims, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

For instance, the detailed description has set forth various embodiments of the devices and/or processes via the use of block diagrams and examples. Insofar as such block diagrams and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any computer-readable medium for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape. Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

The various embodiments described herein can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

TABLE 1

| | op. per pixel | | | | | |
|---|---|---|---|---|---|---|
| | Add | diff | mul | shift | comp | div |
| Curves generation block | 2 | 0 | 0 | 0 | 0 | 0 |
| Signal processing (BPF) | $(2 * (W + H))/(W * H)$ | $(2 * (W + H))/(W * H)$ | $(4 * (W + H))/(W * H)$ | 0 | $(W + H)/(W * H)$ | 0 |
| Matching + ZOI | $(2 * (W + H))/(W * H)$ | $(2 * (W + H))/(W * H) + (2 * S + 1)/(W * H)$ | 0 | $(4 * (W + H))/(W * H)$ | $(6 * (W + H))/(W * H) + (6 * S + 3)/(W * H)$ | $(2 * S + 1)/(W * H)$ |
| TOTAL | $2 + (4 * (W + H))/(W * H)$ | $(4 * (W + H))/(W * H) + (2 * S + 1)/(W * H)$ | $(4 * (W + H))/(W * H)$ | $(4 * (W + H))/(W * H)$ | $(7 * (W + H))/(W * H) + (6 * S + 3)/(W * H)$ | $(2 * S + 1)/(W * H)$ |

TABLE 2

| | op. per frame | | | | | |
|---|---|---|---|---|---|---|
| | Add | Diff | mul | shift | comp | div |
| Video cam mode (HPF) | 6 | 4 | 10 | 0 | 4 | 0 |
| Stabilization | 2 | 0 | 0 | 0 | 4 | 0 |
| TOTAL | 8 | 4 | 10 | 0 | 8 | 0 |

TABLE 3

Numerical results for ST850 sensor (W = 2056; H = 1544), in the case of S = 32.

| | op. per pixel | | | | | |
|---|---|---|---|---|---|---|
| | Add | diff | mul | shift | comp | div |
| Curves generation block | 2 | 0 | 0 | 0 | 0 | 0 |
| Signal processing (BPF) | 0.002268099 | 0.002268099 | 0.00453619 | 0 | 0.001134049 | 0 |
| Matching + ZOI | 0.002268099 | 0.002268099 + 0.000020475 | 0 | 0.00453619 | 0.006804297 + 0.000061427 | 0.0000204758 |
| Video cam mode (HPF) | 0.000001890 | 0.000001260 | 0.000003150 | 0 | 0.000001260 | 0 |
| Stabilization | 0.000000630 | 0 | 0 | 0 | 0.000001260 | 0 |
| TOTAL | 2 + 0.004538718 | 0.004557933 | 0.00453934 | 0.00453619 | 0.008002293 | 0.000020475 |

TABLE 4

| | | FAST SEARCH | | | | |
|---|---|---|---|---|---|---|
| Search Window (−SW:+SW) | FULL SEARCH | STEP = SW/2 (N = 1) | STEP = SW/4 (N = 2) | STEP = SW/8 (N = 3) | STEP = SW/16 (N = 4) | STEP = SW/32 (N = 5) |
| 8 | 17 | 11 | 11 | 17 | — | — |
| 16 | 33 | 19 | 15 | 19 | 33 | — |
| 32 | 65 | 35 | 23 | 23 | 35 | 65 |
| 64 | 129 | 63 | 39 | 31 | 39 | 63 |
| 128 | 257 | 131 | 71 | 47 | 47 | 71 |

TABLE 5

| | op. per pixel | | | |
|---|---|---|---|---|
| | Add | Mul | Div | Comp |
| RGB | 2 + 4 · Full · ((W + H)/(W · H)) + 2 · ((Full)/(W · H)) | 0 | 2 · ((Full)/(W · H)) | 2 · Full · ((W + H)/(W · H)) + 2 · ((Full)/(W · H)) |
| Bayer | 1 + 4 · Full · ((W + H)/(W · H)) + 2 · ((Full)/(W · H)) | 0 | 2 · ((Full)/(W · H)) | 2 · Full · ((W + H)/(W · H)) + 2 · ((Full)/(W · H)) |
| No Div (Bayer) | 1 + 4 · Full · ((W + H)/(W · H)) + 0 | 0 | 0 | 2 · Full · ((W + H)/(W · H)) + 0 |
| No Div + Fast Search (Bayer) | 1 + 4 · Fast · ((W + H)/(W · H)) | 0 | 0 | 2 · Fast · ((W + H)/(W · H)) |

TABLE 6

| | op. per pixel | | | |
|---|---|---|---|---|
| | Add | Mul | Div | Comp |
| RGB | 2 + 0.294852 + 0.000409 | 0 | 0.000409 | 0.147426 + 0.000409 |
| Bayer | 1 + 0.294852 + 0.000409 | 0 | 0.000409 | 0.147426 + 0.000409 |
| No Div (Bayer) | 1 + 0.294852 + 0 | 0 | 0 | 0.147426 + 0 |
| No Div + Fast Search (Bayer) | 1 + 0.117941 | 0 | 0 | 0.058970 |

The invention claimed is:

1. A method of generating signals representing absolute motion vectors of an image of a video sequence, the method comprising:

defining horizontal and vertical weighing functions with values over pixels belonging to a first portion of the image being larger than values over pixels outside the first portion of the image;

computing horizontal and vertical characteristic curves of the image and of a preceding image in the video sequence;

determining a horizontal global displacement between the two images that minimizes a weighted average, calculated using the horizontal weighing function, of an absolute value of a difference between taps of the horizontal characteristic curve of the current image and of a translated replica of the horizontal characteristic curve of the preceding image in the sequence;

determining a vertical global displacement between the two images that minimizes a weighted average, calculated using the vertical weighing function, of an absolute value of a difference between taps of the vertical characteristic curve of the current image and of a translated replica of the vertical characteristic curve of the preceding image in the sequence;

aligning the image with the preceding image in the sequence and calculating relative motion vectors between the aligned images; and generating the signals representing absolute motion vectors between the images as a vector sum of the relative motion vectors and the horizontal and vertical global displacement.

2. The method of claim 1 wherein the images are YUV or RGB images and the characteristic curves are calculated considering only luminance values of pixels.

3. The method of claim 1 wherein the images are YUV or RGB images and the characteristic curves are calculated considering only green pixels.

4. The method of claim 1 wherein the images are Bayer images and the characteristic curves are calculated considering only green pixels.

5. The method of claim 1 wherein the horizontal and vertical weighing functions are null outside the first portion and, within the first portion, are respectively equal to a horizontal and vertical size of the current image.

6. A method of filtering an image of an input video sequence, the method comprising:

defining horizontal and vertical weighing functions with values over pixels belonging to a first portion of the image being larger than values over pixels outside the first portion of said image;

computing horizontal and vertical characteristic curves of the image and of a preceding image in the sequence;

determining a horizontal global displacement between the two images that minimizes a weighted average, calculated using the horizontal weighing function, of an absolute value of a difference between taps of the horizontal characteristic curve of the current image and of a translated replica of the horizontal characteristic curve of the preceding image in the sequence;

determining a vertical global displacement between the two images that minimizes a weighted average, calculated using the vertical weighing function, of an absolute value of a difference between taps of the vertical characteristic curve of the current image and of a translated replica of the vertical characteristic curve of the preceding image in the sequence; and generating a filtered output image by filtering out the horizontal and vertical global displacements from the current image.

7. A method of filtering an image of an input video sequence, the method comprising:

computing horizontal and vertical characteristic curves of the image and of a preceding image in the sequence, then generating corresponding high-pass replicas thereof using a high-pass filter;

calculating a horizontal global displacement between the two images that minimizes an average of an absolute value of a difference between taps of the horizontal high-pass replica characteristic curve of the current image and of a translated replica of the high-pass replica horizontal characteristic curve of the preceding image in the sequence;

calculating a vertical global displacement between the two images that minimizes an average of an absolute value of a difference between taps of the vertical high-pass replica characteristic curve of the current image and of a translated replica of the vertical high-pass replica characteristic curve of the preceding image in the sequence; and generating a filtered output image by filtering out the horizontal and vertical global displacements from the current image.

8. The method of claim 7, further comprising:
high-pass filtering motion vectors with a second order Butterworth IIR high-pass filter, direct form II, with a cut-off frequency of about 0.40 Hz.

9. The method of claim 7, further comprising:
high-pass filtering motion vectors with a second order Butterworth IIR high-pass filter, direct form II, with a cut-off frequency of about 0.40 Hz divided by half a frame rate of the video sequence.

10. A method of filtering an image of an input video sequence, comprising:

computing horizontal and vertical characteristic curves of the image and of a preceding image in the sequence, then generating corresponding band-pass replicas thereof using a Butterworth IIR band-pass filter;

calculating a horizontal global displacement between the two images that minimizes an average of an absolute value of a difference between taps of the horizontal band-pass replica characteristic curve of the current image and of a translated replica of the horizontal band-pass replica characteristic curve of the proceeding image in the sequence;

calculating a vertical global displacement between the two images that minimizes an average of an absolute value of a difference between taps of the vertical band-pass replica characteristic curve of the current image and of a translated replica of the vertical band-pass replica characteristic curve of the preceding image in the sequence; and generating a filtered output image by filtering out the horizontal and vertical global displacements from the current image.

11. The method of claim 10 wherein the Butterworth IIR band-pass filter has cut-off frequencies of about 0.01 Hz and 0.20 Hz.

12. A method of filtering an image of an input video sequence, comprising the steps of:

computing horizontal and vertical characteristic curves of the image and of a preceding image in the sequence, then generating corresponding high-pass replicas thereof;

calculating a horizontal global displacement between the two images that minimizes an average of an absolute value of a difference between taps of the horizontal high-pass replica characteristic curve of the current image and of a translated replica of the horizontal high-pass replica characteristic curve of the proceeding image in the sequence;

calculating a vertical global displacement between the two images that minimizes an average of an absolute value of a difference between taps of the vertical high-pass replica characteristic curve of the current image and of a translated replica of the vertical high-pass replica characteristic curve of the preceding image in the sequence; and generating a filtered output image by filtering out the horizontal and vertical global displacements from the current image.

13. The method of claim 12 wherein a FIR [−1 −8 −28 −55 −62 −28 28 62 55 28 8 1] is employed.

14. The method of claim 12 wherein the images are YUV or RGB images and the characteristic curves are calculated considering only luminance values of pixels.

15. The method of claim 12 wherein the images are YUV or RGB images and the characteristic curves are calculated considering only green pixels.

16. The method of claim 12 wherein the images are Bayer images and the characteristic curves are calculated considering only green pixels.

17. A system to process digital images, comprising:
a Bayer sensor configured to generate Bayer pattern images of captured scenes;
a curve generator configured to generate characteristic curve of Bayer pattern images;
a memory storing the Bayer pattern images and the respective characteristic curves; and
a digital signal processor configured to generate absolute global motion vectors based on the Bayer images and the respective characteristic curves,
wherein the digital signal processor is configured to:
determine a horizontal global displacement between a current image and a preceding image that minimizes a weighted average, calculated using a horizontal weighing function, of an absolute value of a difference between taps of a horizontal characteristic curve of the current image and of a translated replica of a horizontal characteristic curve of the preceding image in the sequence;
determine a vertical global displacement between the two images that minimizes a weighted average, calculated using a vertical weighing function, of an absolute value of a difference between taps of a vertical characteristic curve of the current image and of a translated replica of a vertical characteristic curve of the preceding image in the sequence;
align the current image with the preceding image in the sequence and calculate relative motion vectors between the aligned images; and
generate signals representing absolute motion vectors between the images as a vector sum of the relative motion vectors and the horizontal and vertical global displacement.

18. A system to process digital images, comprising:
a Bayer sensor configured to generate Bayer pattern images of captured scenes;
a curve generator configured to generate characteristic curve of Bayer pattern images;
a memory storing the Bayer pattern images and the respective characteristic curves; and
a digital signal processor configured to generate absolute global motion vectors based on the Bayer images and the respective characteristic curves,
wherein the digital signal processor is configured to:
determine a horizontal global displacement between a current image and a preceding image that minimizes a weighted average, calculated using a horizontal weighing function, of an absolute value of a difference between taps of a horizontal characteristic curve of the current image and of a translated replica of a horizontal characteristic curve of the preceding image in the sequence;
determine a vertical global displacement between the two images that minimizes a weighted average, calculated using a vertical weighing function, of an absolute value of a difference between taps of a horizontal characteristic curve of the current image and of a translated replica of a characteristic curve of the preceding image in the sequence;
align the current image with the preceding image in the sequence and calculate relative motion vectors between the aligned images; and
generate signals representing absolute motion vectors between the images as a vector sum of the relative motion vectors and the horizontal and vertical global displacement.

19. A non-transitory computer readable memory medium comprising contents that cause a computing device to implement a method of processing a digital image, the method including:
defining horizontal and vertical weighing functions with values over pixels belonging to a first portion of the image being larger than values over pixels outside the first portion of the image;
computing horizontal and vertical characteristic curves of the image and of a preceding image in the video sequence;
determining a horizontal global displacement between the two images that minimizes a weighted average, calculated using the horizontal weighing function, of an absolute value of a difference between taps of the horizontal characteristic curve of the current image and of a translated replica of the horizontal characteristic curve of the preceding image in the sequence;
determining a vertical global displacement between the two images that minimizes a weighted average, calculated using the vertical weighing function, of an absolute value of a difference between taps of the vertical characteristic curve of the current image and of a translated replica of the vertical characteristic curve of the preceding image in the sequence;
aligning the image with the preceding image in the sequence and calculating relative motion vectors between the aligned images; and
generating the signals representing absolute motion vectors between the images as a vector sum of the relative motion vectors and the horizontal and vertical global displacement.

20. A method of generating signals representing absolute motion vectors of an image of a video sequence, the method comprising:
defining horizontal and vertical weighing functions with values over pixels belonging to a first portion of the image being larger than values over pixels outside the first portion of the image;
computing horizontal and vertical characteristic curves of the image and of a preceding image in the video sequence;
determining a horizontal global displacement between the two images that minimizes a weighted average, calculated using the horizontal weighing function, of an absolute value of a difference between taps of the horizontal characteristic curve of the current image and of a translated replica of the characteristic curve of the preceding image in the sequence;
determining a vertical global displacement between the two images that minimizes a weighted average, calculated using the vertical weighing function, of an absolute value of a difference between taps of the horizontal characteristic curve of the current image and of a translated replica of the characteristic curve of the preceding image in the sequence;

aligning the image with the preceding image in the sequence and calculating relative motion vectors between the aligned images; and generating the signals representing absolute motion vectors between the images as a vector sum of the relative motion vectors and the horizontal and vertical global displacement.

21. The method of claim 20 wherein the images are YUV or RGB images and the characteristic curves are calculated considering only luminance values of pixels.

22. The method of claim 20 wherein the images are Bayer images and the characteristic curves are calculated considering only green pixels.

23. The method of claim 20 wherein the horizontal and vertical weighing functions are null outside the first portion and, within the first portion, are respectively equal to a horizontal and vertical size of the current image.

* * * * *